US012498339B2

(12) United States Patent
Kowalski et al.

(10) Patent No.: US 12,498,339 B2
(45) Date of Patent: Dec. 16, 2025

(54) FAST, SINGLE INJECTION WELL PLATE MICRO-CALORIMETER USING PHOTONIC SENSORS

(71) Applicants: Northeastern University, Boston, MA (US); The Charles Stark Draper Laboratory, Inc., Cambridge, MA (US)

(72) Inventors: Gregory J. Kowalski, Beverly, MA (US); Dale N. Larson, Waban, MA (US); Jason O. Fiering, Boston, MA (US); Yuwei Zhang, Malden, MA (US)

(73) Assignees: Northeastern University, Boston, MA (US); The Charles Stark Draper Laboratory, Inc., Cambridge, MA (US)

( * ) Notice: Subject to any disclaimer, the term of this patent is extended or adjusted under 35 U.S.C. 154(b) by 838 days.

(21) Appl. No.: 17/658,950

(22) Filed: Apr. 12, 2022

(65) Prior Publication Data

US 2022/0326167 A1    Oct. 13, 2022

Related U.S. Application Data

(60) Provisional application No. 63/174,464, filed on Apr. 13, 2021.

(51) Int. Cl.
*G01N 25/20* (2006.01)
*G01N 1/44* (2006.01)

(52) U.S. Cl.
CPC .............. *G01N 25/20* (2013.01); *G01N 1/44* (2013.01)

(58) Field of Classification Search
None
See application file for complete search history.

(56) References Cited

U.S. PATENT DOCUMENTS 8,076,151 B2    12/2011  Larson et al.
9,377,422 B2     6/2016  Fiering et al.
(Continued)

FOREIGN PATENT DOCUMENTS

WO    2008088829 A2    7/2008
WO    2023/178030 A1   9/2023

OTHER PUBLICATIONS

Modaresifar, Masoud and Kowalski, Gregory J., "Microscale calorimetric device for determining reaction parameters," Thermochimica Acta, 655:137-144 (2017).
(Continued)

*Primary Examiner* — Erica S Lin
(74) *Attorney, Agent, or Firm* — Hamilton, Brook, Smith & Reynolds, P.C.

(57) ABSTRACT

A system for calorimetry includes a well having a volume for receiving a sample, an input feature to facilitate reception of the sample in the well, a light source to irradiate the well and the sample with incident light, and a photonic sensor chip disposed at the bottom of the well. The photonic sensor chip includes plural nanohole array (NHA) sensors. A light detector is configured to measure transmission of light through the NHA sensors to obtain a series of extraordinary optical transmission (EOT) measurements. Frame elements secure and mutually couple the light source, the photonic sensor chip, the light detector, and the input feature to form a calorimetry unit. A processor is configured to calculate a calorimetry measurement as a function of the series of EOT measurements, the calorimetry measurement being indicative of energy released as a result of the sample in the well undergoing a change.

22 Claims, 18 Drawing Sheets

(56) References Cited

U.S. PATENT DOCUMENTS

| | | | |
|---|---|---|---|
| 10,677,661 B2 | 6/2020 | Modaresifar et al. | |
| 2011/0255745 A1* | 10/2011 | Hodder | G01N 21/59 356/51 |
| 2011/0286493 A1* | 11/2011 | Torniainen | B41J 2/1404 374/33 |
| 2018/0128693 A1* | 5/2018 | Modaresifar | G01K 17/006 |
| 2022/0252468 A1 | 8/2022 | Kowalski et al. | |

OTHER PUBLICATIONS

Sen Mehmet, Ali, "Design and Development of Calorimetric Biosensors Using Extraordinary Optical Transmission Through Nanohole Arrays", pp. 1-185 (Aug. 1, 2012).

Anonymous, "A Fast, Single Injection Well Plate Micro-Calorimeter Using Photonic Sensors", pp. 1-2 (Oct. 6, 2021).

Kowalski, G. J., et al., "Fast temperature sensing using changes in extraordinary optical transmission through an array of subwavelength apertures", Optical Engineering, Soc. of Photo-Optical Instrumentation Engineers, Bellingham; The Institution of Electrical Engineers, Stevenage, GB, vol. 48 (10): 104402-1 (Oct. 1, 2009).

Kowalski, G. J., et al., "Thermal management design of a nanoscale biocalorimeter", Proceedings of the ASME Interpack Conference—2007: Presented at 2007 ASME Interpack Conference, Jul. 8-12, 2007, Vancouver, BC, Canada (vol. 1), vol. 2, pp. 939-946 (Jul. 8, 2007).

Couture, Maxime, et al., "96-Well Plasmonic Sensing with Nanohole Arrays", ACS Sensors, vol. 1(3):287-294, XP093049905, US ISSN: 2379-3694, DOI: 10.1021/acssensors.5b00280 Retrieved from the Internet: URL:https://pubs.acs.org/doi/pdf/10.1021/acssensors. 5b00280 (Jan. 27, 2016).

International Search Report and Written Opinion for PCT/US2023/064223, entitled "Fast Well Plate Differential Scanning Micro-Calorimeter Using Photonic Sensors," dated Jun. 5, 2023.

Bruylants, G., et al., "Differential Scanning Calorimetry in Life Science: Thermodynamics, Stability, Molecular Recognition and Application in Drug Design," Current Medicinal Chemistry, 12:2011-2020 (2005).

Jelesarov, Ilian and Bosshard, Hans Rudolf, "Isothermal titration calorimetry and differential scanning calorimetry as complementary tools to investigate the energetics of biomolecular recognition," J. Mol. Recognit., 12:3-18 (1999).

Lai, s.L., et al., "Highspeed (104° C/s) scanning microcalorimetry with monolayer sensitivity (J/m2)," Applied Physics Letters, 67(9):1229-1231 (1995).

Kissinger, Homer E., "Reaction Kinetics in Differential Thermal Analysis" Analytical Chemistry, 29(11):1702-1706 (1957).

Krell, Tino, "Microcalorimetry: a response to challenges in modern biotechnology," Microbial Biotechnology 1(2):126-136 (2008).

Ritchie, et al., "Evolution of Medieval Gunpowder: Thermodynamic and Combustion Analysis," ACS Omega, 6:22848-22856 (2021).

Sabbah, R., et al., "Reference materials for calorimetry and differential thermal analysis," Thermochimica Acta, 331:93-94 (1999).

Claveria-Gimeno, et al., "A look at ligand binding thermodynamics in drug discovery," Expert Opinion on Drug Discovery, 12:4, 363-377, DOI: 10.1080/17460441.2017.1297418 (Accepted Feb. 16, 2017).

Miles, et al., "The Kinetics of the Thermal Denaturation of Collagen in Unrestrained Rat Tail Tendon Determined by Differential Scanning Calorimetry," J. Mol. Biol., 245:437-446 (1995).

* cited by examiner

125

227-1  227-2

325

FAST, SINGLE INJECTION WELL PLATE MICRO-CALORIMETER USING PHOTONIC SENSORS

RELATED APPLICATION

This Application claims the benefit of U.S. Provisional Application No. 63/174,464, filed on Apr. 13, 2021. The entire teachings of the above Application are incorporated herein by reference.

BACKGROUND

Calorimetry involves measuring energy released or absorbed by a reaction over a range of reactant concentrations, and determining the thermodynamic properties, stoichiometry, and equilibrium binding constant for the reaction from the measured transfer of energy.

Temperature sensors conventionally employed for determining the heat of a chemical reaction in calorimetry studies include thermocouples, thermopiles, and/or thermistors. Other temperature sensing methods include sensors with microfluidic channels and have used changes in optical properties to infer temperature changes in reactions.

SUMMARY

A system for calorimetry includes a well having a volume for receiving a sample, an input feature configured to facilitate reception of the sample in the well, a light source configurable to irradiate the well and the sample with incident light, and a photonic sensor chip disposed at the bottom of the well. The photonic sensor chip includes plural nanohole array (NHA) sensors integrated upon a substrate. A light detector is configured to measure transmission of light through the NHA sensors to obtain a series of extraordinary optical transmission (EOT) measurements. The system includes frame elements that are configured to secure and mutually couple the light source, the photonic sensor chip, the light detector, and the input feature to form a calorimetry unit. A processor is configured to calculate a calorimetry measurement as a function of the series of EOT measurements, the calorimetry measurement being indicative of energy released as a result of the sample in the well undergoing a change.

The input feature can include an injection device, e.g. a micro-pipette, configured to access the volume of the well and deposit the sample therein.

The well can be one of a plurality of wells disposed upon a well plate. The injection device can be configured to access the volume of each of the wells, or there can be multiple injection devices, e.g., one injection device for each well.

The input feature can include one or more diffusion features, e.g., a plurality of holes, disposed through a frame element forming a wall of the well, the diffusion features configured, while the calorimetry unit is immersed in a fluid, to permit a volume of the fluid including the sample to flow into the well.

The system can include at least one filter element configured to control the flow of the sample into the well.

The system can include a power supply configured to control an intensity of the light source within a range of intensities between 0 and 500 lux, according to a voltage setting of the power supply, or, alternatively, by adjusting a resistance value of an electrically resistive component connected within a circuit that includes the light source. Adjusting the resistance value may include, for example, disconnecting a first electrical resistor and connecting a second electrical resistor of a different resistance value than the first electrical resistor, adding or removing a second electrical resistor in series or parallel with a connected first electrical resistor, adjusting a potentiometer electrically coupled with the light source, or another method of adjusting a resistance value within an electrical circuit. The power supply can be spatially separated from the calorimetry unit and can include at least one battery, or a switchable DC power supply device.

The light source can include a light-emitting diode (LED) and a collimator operatively coupled with the LED to control a direction of rays of light emitted by the LED.

The system can include a heater in thermal contact with the well, and a heater controller coupled to the heater, the heater controller programmed to control the heater to apply heat to the well with the sample provided therein.

The light detector can include at least one of (i) a charge-coupled device (CCD) chip, a complementary metal oxide semiconductor (CMOS) device, or a photo-multiplier tube (PMT) positioned to receive light transmitted as an EOT transmission through the NHA sensors of the photonic sensor chip disposed at the bottom of the well, and (ii) a camera positioned to receive light transmitted as an EOT transmission at least through the NHA sensors of the photonic sensor chip disposed at the bottom of the well. For example, the light detector can include the camera, and the camera can be positioned to receive light transmitted as an EOT transmission through NHA sensors of a plurality of photonic sensor chips, each photonic sensor chip of the plurality of photonic sensor chips being respectively disposed at the bottom each well in a well plate.

The system can include a lens configurable to focus, upon the light detector, light transmitted as an EOT transmission through the NHA sensors of the photonic sensor chip disposed at the bottom of the well. A lens frame element can be provided to secure the lens and to be mutually physically coupled with one or more other frame elements of the calorimetry unit.

The system can include an optics controller configured to control aspects of at least one of the light source and the light detector. The system can further include memory configured to store data acquired from the light detector. The processor, the optics controller, and the memory can be integrated within an electronic microcontroller device operatively coupled with, and spatially separate from, the calorimetry unit.

A method for calorimetry includes providing a sample to a well, or otherwise permitting the sample to enter the well, via an input feature, configuring a light source to irradiate the well and the sample with incident light, and measuring, via a light detector, transmission of light through plural NHA sensors to obtain a series of EOT measurements. The NHA sensors can be integrated upon a substrate of a photonic sensor chip disposed at the bottom of the well. A calorimetry measurement can be calculated as a function of the series of EOT measurements, the calorimetry measurement being indicative of energy released as a result of the sample in the well undergoing a change.

The input feature can include an injection device. Providing the sample to the well, or otherwise permitting the sample to enter therein, can include configuring the injection device to access the volume of the well and to deposit the sample therein.

The input feature can include a plurality of diffusion features disposed through a frame element forming a wall of the well. Providing the sample to the well, or otherwise permitting the sample to enter therein, can include permitting a volume of a fluid including the sample to flow into the well via the plurality of diffusion features while the calorimetry unit is immersed in the fluid.

The method can include configuring a power supply to control an intensity of the light source within a range of intensities between 0 and 500 lux according to a voltage setting of the power supply, or, alternatively, by adjusting a resistance value of an electrically resistive component connected within a circuit that includes the light source as described hereinabove, thereby tuning an amount of light transmitted as an EOT transmission through the NHA sensors of the photonic sensor chip for improved detection of the change undergone by the sample in the well according to the calorimetry measurement.

Measuring transmission of light can include capturing, and storing in memory, video data representing light transmitted as an EOT transmission at least through the NHA sensors of the photonic sensor chip disposed at the bottom of the well. If the stored video data includes color video data, the color video data can be converted to black and white video data. The method can further include identifying bright spots, corresponding to individual NHA sensors, represented in the stored video data by i) comparing, with a brightness threshold value, brightness information corresponding to pixels represented within the stored video data, and ii) determining locations within the view where the brightness information exceeds the threshold value. Brightness information corresponding to pixels represented within the stored video data for a given individual NHA sensor can be averaged. The averaging can be performed spatially over a pixel array of pre-defined dimensions, the pixel array defining a region that includes at least part of the given NHA sensor.

The method can include applying heat to the well before the measuring of transmission of light.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1:
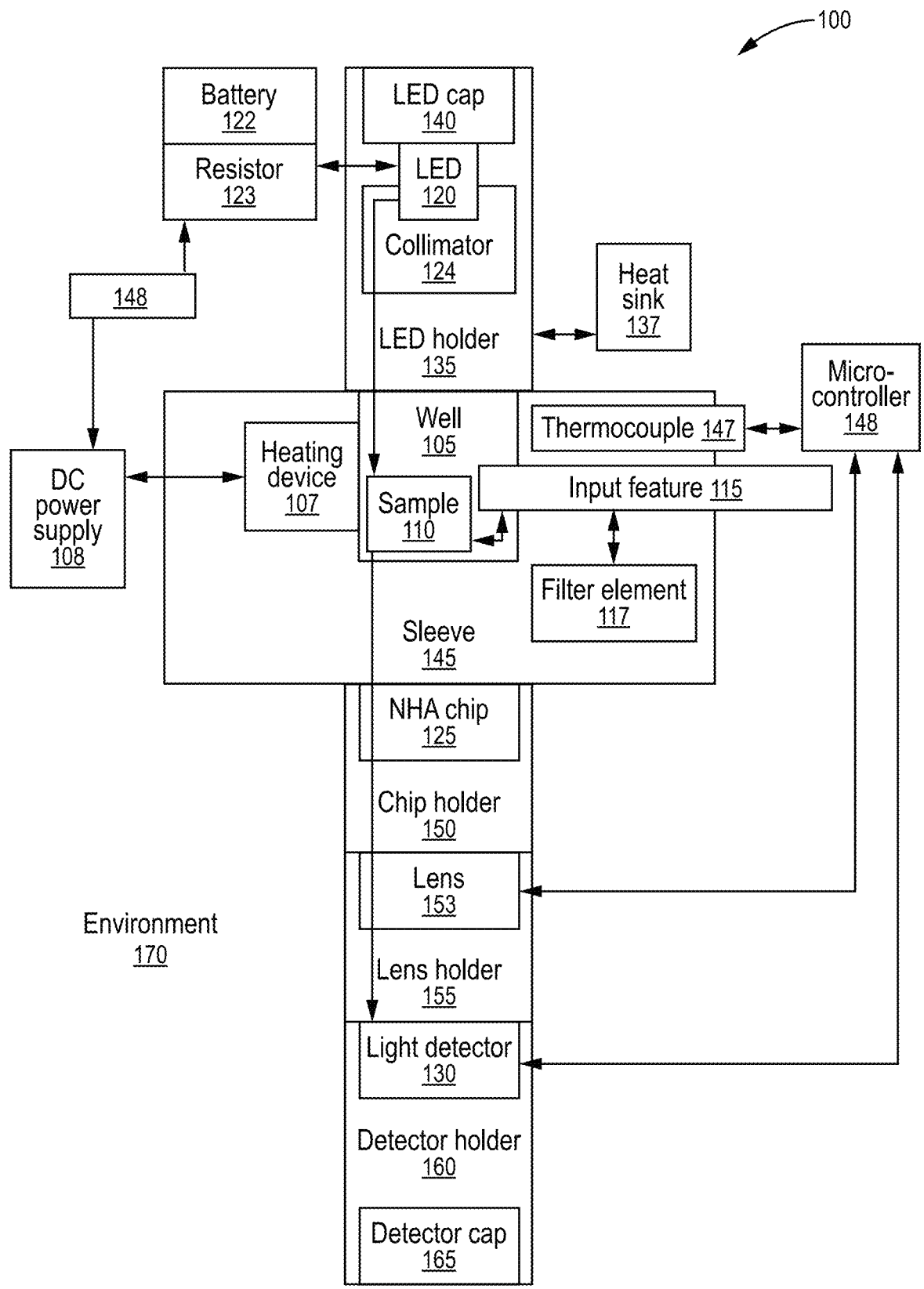
FIG. 1 is a block diagram of an example micro-calorimetry system according to embodiments of the present disclosure.

A description of example embodiments follows.

Embodiments provide a method and system for calorimetry, i.e., for performing calorimetric testing on one or more samples. Such samples may be in fluid form (e.g., a liquid solution, or a gas). Alternatively, or in addition, such samples may be in other forms, such as solid form (e.g., a powder, a crystal, an alloy, or any other solid form of matter known in the art). Such samples may enter via an input feature of a test chamber, i.e., a well, of such a system for calorimetry, for example by being injected via an injection device included with the input feature, or by passively moving through the input feature such that the input feature functions as a diffusion feature.

Calorimetric testing may be performed, using the disclosed method and system, to study different phenomena depending upon the nature or form of the one or more samples. Testing may be performed to determine an amount of energy released or absorbed in a process of a change undergone by the one or more samples, e.g., a chemical reaction; a denaturing of molecules; an unfolding of proteins; a phase change of matter such as melting, vaporization, solidification or freezing, condensing, etc.; and other types of changes in matter known in the art.

Devices and methods for ultra-sensitive temperature sensing and calorimetry have been described by Larson and Kowalski in International Patent Application Publication WO2008/088829, published Jul. 24, 2008, and corresponding U.S. Pat. No. 8,076,151 to Larson and Kowalski, issued Dec. 13, 2011, the teachings of which are incorporated herein by reference in their entirety.

A system and method for a microfluidic calorimeter have been described in U.S. Pat. No. 9,377,422 to Fiering et al., issued Jun. 28, 2016, the teachings of which are incorporated herein by reference in their entirety. Another system and method for a microfluidic calorimeter have been described in U.S. Pat. No. 10,677,661 to Modaresifar and Kowalski, issued Jun. 9, 2020, the teachings of which are incorporated herein by reference in their entirety.

In some embodiments, a photonic sensor-enabled microcalorimeter device may be used in early stages of drug discovery; and to investigate energy exchanges related to protein unfolding, denaturing of biological materials, or DNA, MRNA, and RNA reactions; or energy releases in materials due to magnetic or phase changes. It is compatible with robotic injection systems commonly used in pharmaceutical laboratories.

Instances of the device may be sized so as to configure individual wells in a well plate to be micro-calorimeters. Well plates used as such may include a standard quantity of wells, such as, for example, a well plate with 96 wells, a well plate with 384 wells, and well plates with other numbers of wells. Such configurations support high throughput screening using small amounts of compounds as samples. Such configurations also facilitate gathering of thermodynamic data that can be analyzed to identify promising drug candidates for further development.

Other instances of the device may be adapted to function when immersed in a liquid environment, as further described hereinbelow. Such devices may be referred to as floating microcalorimeters.

Embodiments use a photonic sensor to determine a change in extraordinary optical transmission (EOT) through an array of nanoholes to measure temperature and concentration change in a sample of interest. A photonic sensor chip may be composed of a metallic film that is deposited on a dielectric substrate. A nanohole array (NHA) pattern may be micro-manufactured using a nano, micro, or MEMS manufacturing process, or a combination of techniques thereof, in the metallic film. Such an NHA sensor may include, for example, a 10×10 array of apertures with a diameter of 150 nm and pitch size of 350 nm. These small holes can be made by using Focused Ion Beam or lithographic type processes on a 100 nm gold layer on a glass substrate. Suitable NHA sensor configurations and dimensions are described, for example, in U.S. Pat. Nos. 8,076,151; 9,377,422; and 10,677,661.

In one example embodiment, a photonic chip 410 is manufactured by depositing a metallic film (e.g., gold) over a dielectric substrate (e.g., glass). A pattern of nanoholes, approximately 150 nm in diameters, placed at a pitch of 300 nm, are "drilled" into the metallic film using a technique such as focused ion beam (FIB) or by lithography means.

The photonic chip may be sized to fit into the bottom of each well in the well plate. The typical pattern is an array size of 10×10 nanoholes, which defines the NHA sensor, and typically nine sensors would be placed in each well.

In some embodiments, the photonic chip is placed in the bottom of a test chamber, which test chamber may be embodied as a well. The well may be filled with buffer and a first reactant, reactant A, which may be a protein, or another type of reactant. A second reactant, reactant B, which may be a ligand or drug candidate, or another type of reactant, may then be added to the well. An input feature, such as an injection device, which may include an injection device such as a microfluidic injector, dip pen, automated pipette, or other device as is commonly used in the art, may be positioned asymmetrically in the well. Alternatively, the input feature may include diffusion features, such as holes disposed through a wall of the well, to permit diffusion or otherwise passive entry of sample material into the well, while the well is immersed in an environment containing elements of the sample material.

A heater may be attached to the perimeter of the photonic chip, or disposed between a wall of the well and a sleeve positioned to encircle the outside of the wall, or disposed inside of the well, to control the temperature of the reaction. Such a heater may be used to calibrate an individual microcalorimeter or multiple micro-calorimeters of a well plate-based embodiment. The heater may be a thermoelectric heater, a resistive coil heater, or any other heating apparatus known in the art. The heater may include a power supply connected across a pair of heater wire terminals of a material such as nichrome.

A monochromatic, collimated beam of light may be passed through the well and may be incident on the photonic chip. The incident light on the metallic film creates a surface plasmon resonance with the nanohole pattern that amplifies the transmitted light through the nanoholes. Such amplification produces extraordinary optical transmission (EOT).

The EOT is related to a ratio of the dielectric constants of the sample material and that of the metallic film.

The EOT varies in relation to the changes in the dielectric constants, which are dependent on the temperature and concentration of the sample in the well. The changes in the temperature and concentration are directly related to energy released from reactions occurring in the well. The changes in the EOT may be recorded by an optical device, such as CCD or CMOS camera or photomultiplier tubes.

In some embodiments, computer-implemented methods include analyzing image or video data of EOT recorded by the optical device to examine characteristics of changes occurring to a sample in a well, such as changes in temperature, concentration, and energy being released as a result of a reaction involving the sample. Some benefits of using a photonic sensor are its small size and its sensitive response to changes in temperature of a sample. For water-based samples, sensitivity of the photonic sensor may be, e.g., around 5 picojoules, and a sample as small as, e.g., 25 nl can be analyzed. A response speed of the photonic sensor approaches the speed of light. These exemplary sizes and response times are orders of magnitudes different, by factors of 20 to 500, from currently available calorimeters. The photonic sensor, because of its optical excitation modality and recording capability, does not require a wired connection to the well, resulting in increased compatibility of embodiments of the device with existing laboratory arrangements.

The device facilitates determination of thermodynamic properties of materials in the well, such as entropy flow, Gibbs free energy, and a reaction equilibrium constant, which may include various drug candidates and which may house controlled reactions involving such drug candidates. The compatibility of the device with current, early-stage pharmaceutical testing procedures, while providing advanced information about reactions occurring inside the well, is a niche currently not filled by any device.

In an example embodiment, a monochromatic LED, outputting substantially monochromatic light with a nominal wavelength of 632 nm and a beam divergence of 5 degrees, is positioned above the well to provide the incident light. The positioning may allow a fluid delivery device, i.e., injection device, to enter the well through an input feature, which input feature may be disposed along a perimeter of the well so as to avoid interference with the LED or with the light produced by the LED. This injection site allows a thermal front and a concentration front of the reaction to be observed as it moves across the photonic chip. The transmitted light through the photonic chip may be recorded as image or video data by an optical device such as a CCD or CMOS camera mounted below the well, or a CCD chip located under the well. Such recorded image or video data may be acquired and analyzed using a computer to recognize and quantify changes occurring in the transmitted light, i.e., the EOT. The photonic chip may employ a perimeter heater that can cause a change in temperature between 25-50 C. The perimeter heater associated with the photonic chip may be used for calibration purposes.

A method may begin by exposing a well to the monochromatic collimated beam of light that is incident on the photonic chip. A light detector, i.e., optical device such as a CCD chip, CCD camera, or other means to view the transmitted light through the photonic chip, may be placed underneath the well. The light detector may then record light transmitted by the photonic chip, i.e., the EOT.

A calibration procedure may be used to determine a relationship between the temperature within the well and corresponding values of EOT. In an example calibration procedure, the heater is turned on, and the EOT is recorded as a function of time. The heater power may also be measured as a function of time. An expected monotonic EOT vs. time relationship may thus be established, with information, as to an associated level of energy released within the well, attainable via the heater power data. EOT data, subsequently collected during an experiment with the well populated by a sample, may then be analyzed to determine a time value and corresponding EOT value at which an observable deviation from the expected monotonic EOT vs. time relationship is observed. The energy released, during a time period including the variation between the expected monotonic EOT vs. time relationship and the observed EOT values, may then be calculated using the heater power data. Computer-implemented calibration methods based on thermodynamic relationships may be used for analyses other than determinations of energy released, such as entropy change and reaction equilibrium constant, which are useful parameters for selecting promising drug candidates for further research in a development process thereof.

A sensor may move within its well due to changes in the temperature during the experiment. To overcome this problem, a field capture method or process may be used to measure and post-process the EOT values. In the field capture process, video data for a view of the NHA sensors is captured and stored in memory. As mentioned above, in some embodiments, the view includes every NHA sensor array on the photonic chip. Some embodiments are configured to process black-and-white video data; as such, embodiments of the field capture process include converting any color video data to black and white video data for processing. Such processing subsequently begins by identifying bright spots, corresponding to individual NHA sensors, represented in the stored video data. Bright spots may be identified by examining brightness information corresponding to pixels represented within the stored video data, and comparing the brightness information with a pre-determined or pre-set brightness threshold value. Such identification of bright spots may be performed using a publicly-available data analysis software application such as MATLAB, among other applications. In some embodiments, x-y coordinates of individual pixels, or groups thereof, corresponding with the identified bright spots are defined relative to an origin. Such x-y coordinates may be stored in memory for later reference.

The field capture process continues by referring to the defined x-y coordinates of identified bright spots, and performing a pixel averaging procedure incorporating brightness data corresponding to neighboring pixels of the respective pixels corresponding to the identified bright spots. For a given bright spot, such neighboring pixels, along with the pixel(s) corresponding with the identified bright spots, together represent video data for a given NHA sensor. The pixel averaging procedure for a given bright spot may be a spatial average incorporating brightness data corresponding to pixels comprising a pixel array of pre-defined dimensions. Such a pixel array may define a region that includes at least a part of the given NHA sensor, but, preferably, the whole NHA sensor. The pre-defined dimensions of the pixel array may, for example, be any odd number of pixels in x- and y-directions, such as 3, 5, 7, 9, or 11 pixels, etc. The number of pixels in the x-direction may or may not be the same as the number of pixels in the y-direction. In a best-mode implementation of the pixel averaging procedure, pre-defined dimensions of 13×13 pixels, respectively in the x- and y-directions, were found to produce an array of pixel data with a lowest level of observed measurement noise. Predefined dimensions for such a best mode may vary depending upon the specific CCD camera used to capture the video data, and may be determined empirically therefrom.

Example benefits of using a photonic sensor are its small size, so as to fit in a well of a standard well plate, and its sensitive response to the changes in temperature and concentration of a sample inside the well. For water based samples, the sensitivity of a photonic sensor may be, for example, 5 picojoules, and the size of the sample can be as small 25 nl, or smaller. The response speed of the photonic sensor approaches the speed of light. As mentioned hereinabove, these sizes and response times are orders of magnitudes, from a factor of 20 to 500, different from currently available calorimeters.

A variation of the proposed device observes EOT through a sample as the sample is heated to a maximum temperature. An EOT-time response may follow an expected temperature-time curve until an energy release or absorption process occurs within the well. The energy release process causes an observable variation in the observed EOT trend. This variation, compared with knowledge of heat flow through the sample obtained prior to the variation, enable the magnitude of energy released at the time of the variation to be determined. Once this energy release is determined, the EOT-temperature relationship may allow other thermodynamic properties, such as entropy flow, the Gibbs free energy, and the equilibrium constant, to be determined.

Single Injection Well Plate Micro-Calorimeter

In one embodiment, a single injection well plate micro-calorimeter using photonic sensors (SIWPCPS) is a device that may be used in early, high throughput stages of drug discovery to obtain thermodynamic data on reactions involving various candidate compounds. A photonic sensor may be used to observe changes in EOT for samples disposed in an array of wells on a well plate, such as 96 or 384 well plate used in a drug discovery process. The changes in EOT through an array of nanoholes are related to temperature and concentration changes caused by the energy released of the reaction.

As described hereinabove, in example embodiments, the photonic sensor is composed of a metallic film that is deposited on a dielectric substrate. A nanohole array pattern may be micro-manufactured using nano, micro or MEMS techniques in the metallic film. In these embodiments, the photonic sensor, i.e., the NHA sensor, forms the bottom of the well in the well plate. A circumferential heater may be positioned about the perimeter of the well, and may be located outside of the well. The heater may be configured to control a temperature of material inside the well as well as to provide calibration information as described hereinabove. A micro pipette may be asymmetrically positioned relative to the well, and may function as an injection device included within an input feature of the well. The micro-pipette thus may be used to inject a fluid sample into the well. Alternatively, fluid samples, including potential reactants, may flow into and out of the well using a microfluidic delivery system. The heater may be turned on to change the temperature of the sample while a monochromatic, collimated beam of light is passed through the well and is incident on the photonic chip. As described hereinabove, the incident light on the metallic film creates a surface plasmon resonance with the nanohole pattern that amplifies the EOT, which, in turn, is recorded by a light detector. The light detector may be a CCD chip, which may be installed in multiple wells or in each well of the well plate. Alternatively, the light detector may be a single camera configured to view the entire well plate, or a plurality of cameras coordinated to each view a portion of the well plate such that the entire well plate may be viewed by at least one of the plurality of cameras. Such cameras may be CCD cameras and may be capable of recording video data. The EOT thus viewable by such light detectors is related to a ratio of the dielectric constants of the sample material and that of the metallic film. The EOT varies in relation to the changes in the dielectric constants which are dependent on the temperature and concentration of the sample. The changes in the temperature and concentration are directly related to the energy released from a reaction involving the sample.

A well plate-calorimeter device, such as the SIWPCPS, may be a single use instrument that can be returned to the manufacturer for recycling. This eliminates the need to clean the well plate, and increases the speed of conducting experiments.

Diffusion-Enabled Floating Micro-Calorimeter

Embodiments, such as the prototype, may use a 3D printed shell, and may be designed to use transparent materials to allow light travel through internal components. The outside of the calorimetry unit may be painted black.

The well inside the calorimetry unit may function as a reaction container as is used in calorimetry. A diameter of the well may be 5.5 mm, as is the case with a standard 96-well plate. Input features may include diffusion features, such as small holes in the wall of the well to allow samples, including microbes, to flow into and out of the well. There may be 16 such holes, or another number of holes. The well may connect to frame elements other sections of the calorimetry unit using a threaded design.

The light source may be an LED with wavelength, for example, between 625 mm and 635 mm, thus producing red light. The battery and other circuit boards may be disposed apart from the calorimetry unit so as to avoid influencing temperatures within the well.

An O-ring, or gasket, made with soft rubber materials, may be placed between an end cap and a next frame element within an assembled calorimetry unit.

A frame element adapted to house the light source and collimator may be referred to as a light source holder or an LED holder. A heat sink may be attached to an outer surface of the light source holder, so as to direct heat generated by the light source and any electronics integrated therewith away from the well and the sample therein. A number of holes, e.g., four holes, may be disposed axially through an end cap to facilitate sealing of the end cap against the adjacent O-ring by engaging a screw through each of the holes.

Frame elements located in a lower body region of the calorimetry device and adapted to hold the photonic chip, and the light detector, respectively, may be referred to as a chip holder, and a light detector holder (or camera holder, or CCD holder).

Two bosses with holes disposed therethrough may be attached to an outer surface of the end caps and may be used to physically guide wires otherwise electrically connected to internal elements such as the light source and light detector. A center hole in each end cap may be used to run the electrical wires from the exterior of the calorimetry unit to the aforementioned internal elements. An upper end cap may be connected to floating materials which have low density, while a lower end cap may be connected to anchor the floating calorimetry unit. The four small holes are designed to connect other parts with screws.

DESCRIPTION OF THE FIGURES

FIG. 1 is a block diagram of an example micro-calorimetry system 100. A system 100 for calorimetry includes a well 105 having a volume for receiving a sample 110, an input feature 115 configured to facilitate reception of the sample 110 in the well 105, a light source 120 configurable to irradiate the well 105 and the sample 110 with incident light, and a photonic sensor chip 125 disposed at the bottom of the well 105. The photonic sensor chip 125 may include plural nanohole array (NHA) sensors integrated upon a substrate. A light detector 130 is configured to measure transmission of light through the NHA sensors to obtain a series of extraordinary optical transmission (EOT) measurements. The system 100 includes frame elements 135, 140, 145, 150, 155, 160, 165 that are configured to secure and mutually couple the light source 120, the photonic sensor chip 125, the light detector 130, and the input feature 115 to form a calorimetry unit. A processor is configured to calculate a calorimetry measurement as a function of the series of EOT measurements, the calorimetry measurement being indicative of energy released as a result of the sample 110 in the well 105 undergoing a change.

The input feature 115 can include an injection device, e.g. a micro-pipette, configured to access the volume of the well 105 and deposit the sample 110 therein.

The well 105 can be one of a plurality of wells disposed upon a well plate. The injection device can be configured to access the volume of each of the wells, or there can be multiple injection devices, e.g., one injection device for each well.

The input feature 115 can include one or more diffusion features, e.g., a plurality of holes, disposed through a frame element forming a wall of the well 105, the diffusion features configured, while the calorimetry unit is immersed in an environment 170 such as a fluid, to permit a volume of the fluid including the sample 110 to flow into the well 105.

The system 100 can include at least one filter element 117 configured to control the flow of the sample 110 into the well 105. Such filters 117 may permit or arrest passage of samples of various sizes or structures into the well. For example, microbes or viruses may be allowed to pass into the well, or blocked by such filters 117.

The system 100 can include a light source power supply 122 configured to control an intensity of the light source 120 within a range of intensities between, for example, 0 and 500 lux, or other ranges, according to a voltage setting of the power supply 122. Such a voltage setting may be controlled via a selectable, switchable, or variable resistor 123 electrically coupled with the power supply 122. The system 100 may include a heater power supply 108 configured, via a heater controller 149, to control heat applied to the well 105 and the sample 110 therein 105. The light source power supply 122 and the heater power supply 108 can be spatially separated from the calorimetry unit and can include at least one battery, or a switchable DC power supply device. Using a switchable DC power supply device as a heater power supply 108 promotes consistent application of heat to the well with minimal variation or degradation in heat applied, as opposed to batteries, which will result in less heat being applied to the well as the batteries discharge. The heater controller 149 may be integrated with the microcontroller 148.

The light source 120 can include a light-emitting diode (LED) and a collimator 124 operatively coupled with the LED to control a direction of rays of light emitted by the LED.

The system can include a heater 107 in thermal contact with the well 105, and a heater controller coupled to the heater, the heater controller programmed to control the heater 107 to apply heat to the well 105 with the sample 110 provided therein.

The light detector 130 can include at least one of (i) a charge-coupled device (CCD) chip, a complementary metal oxide semiconductor (CMOS) device, or a photo-multiplier tube (PMT) positioned to receive light transmitted as an EOT transmission through the NHA sensors of the photonic sensor chip 125 disposed at the bottom of the well 105, and (ii) a camera positioned to receive light transmitted as an EOT transmission at least through the NHA sensors of the photonic sensor chip 125 disposed at the bottom of the well 105. For example, the light detector 130 can include a camera, and the camera can be positioned to receive light transmitted as an EOT transmission through NHA sensors of a plurality of photonic sensor chips 125, each photonic sensor chip 125 of the plurality of photonic sensor chips 125 being respectively disposed at the bottom of each well 105 in a well plate.

The system 100 can include a lens 153 configurable to focus, upon the light detector 130, light transmitted as an EOT transmission through the NHA sensors of the photonic sensor chip 125 disposed at the bottom of the well 105. A lens frame element 155 can be provided to secure the lens and to be mutually physically coupled with one or more other frame elements of the calorimetry unit.

The system 100 can include an optics controller configured to control aspects of at least one of the light source 120, the lens 153, and the light detector 130. The system 100 can further include memory configured to store data acquired from the light detector 130. The processor, the optics controller, and the memory can be integrated within an electronic microcontroller device 148 operatively coupled with, and spatially separate from, the calorimetry unit.

A method for calorimetry includes providing a sample 110 to a well 105, or otherwise permitting the sample 110 to enter the well 105, via an input feature 115, configuring a light source 130 to irradiate the well 105 and the sample 110 with incident light, and measuring, via a light detector 130, transmission of light through plural NHA sensors to obtain a series of EOT measurements. The NHA sensors can be integrated upon a substrate of a photonic sensor chip 125 disposed at the bottom of the well. A calorimetry measurement can be calculated as a function of the series of EOT measurements, the calorimetry measurement being indicative of energy released as a result of the sample 110 in the well 105 undergoing a change.

The input feature 115 can include an injection device. Providing the sample 110 to enter the well 105, or otherwise permitting the sample 110 to enter therein 105, can include configuring the injection device 115 to access the volume of the well 105 and to deposit the sample 110 therein 105.

The input feature 115 can include a plurality of diffusion features disposed through a frame element forming a wall of the well 105. Providing the sample 110 to the well 105, or otherwise permitting the sample 110 to enter therein 105, while the calorimetry unit is immersed in an environment 170 such as a fluid environment, can include permitting a volume of the fluid including the sample 110 to flow into the well 105 via the plurality of diffusion features.

The method can include configuring a light source power supply 122 to control an intensity of the light source 120 within a range of intensities between 0 and 500 lux according to a voltage setting of the light source power supply 122, thereby tuning an amount of light transmitted as an EOT transmission through the NHA sensors of the photonic sensor chip 125 for improved detection of the change undergone by the sample 110 in the well 105 according to the calorimetry measurement.

Measuring transmission of light can include capturing, and storing in memory, video data representing light transmitted as an EOT transmission at least through the NHA sensors of the photonic sensor chip 125 disposed at the bottom of the well 105. If the stored video data includes color video data, the color video data can be converted to black and white video data. The method can further include identifying bright spots, corresponding to individual NHA sensors, represented in the stored video data by i) comparing, with a brightness threshold value, brightness information corresponding to pixels represented within the stored video data, and ii) determining locations within the view where the brightness information exceeds the threshold value. Brightness information corresponding to pixels represented within the stored video data for a given individual NHA sensor can be averaged. The averaging can be performed spatially over a pixel array of pre-defined dimensions, the pixel array defining a region that includes at least part of the given NHA sensor.

The method can include applying heat to the well with a heating device 107 before the measuring of transmission of light.

Figures 2A, 2B:
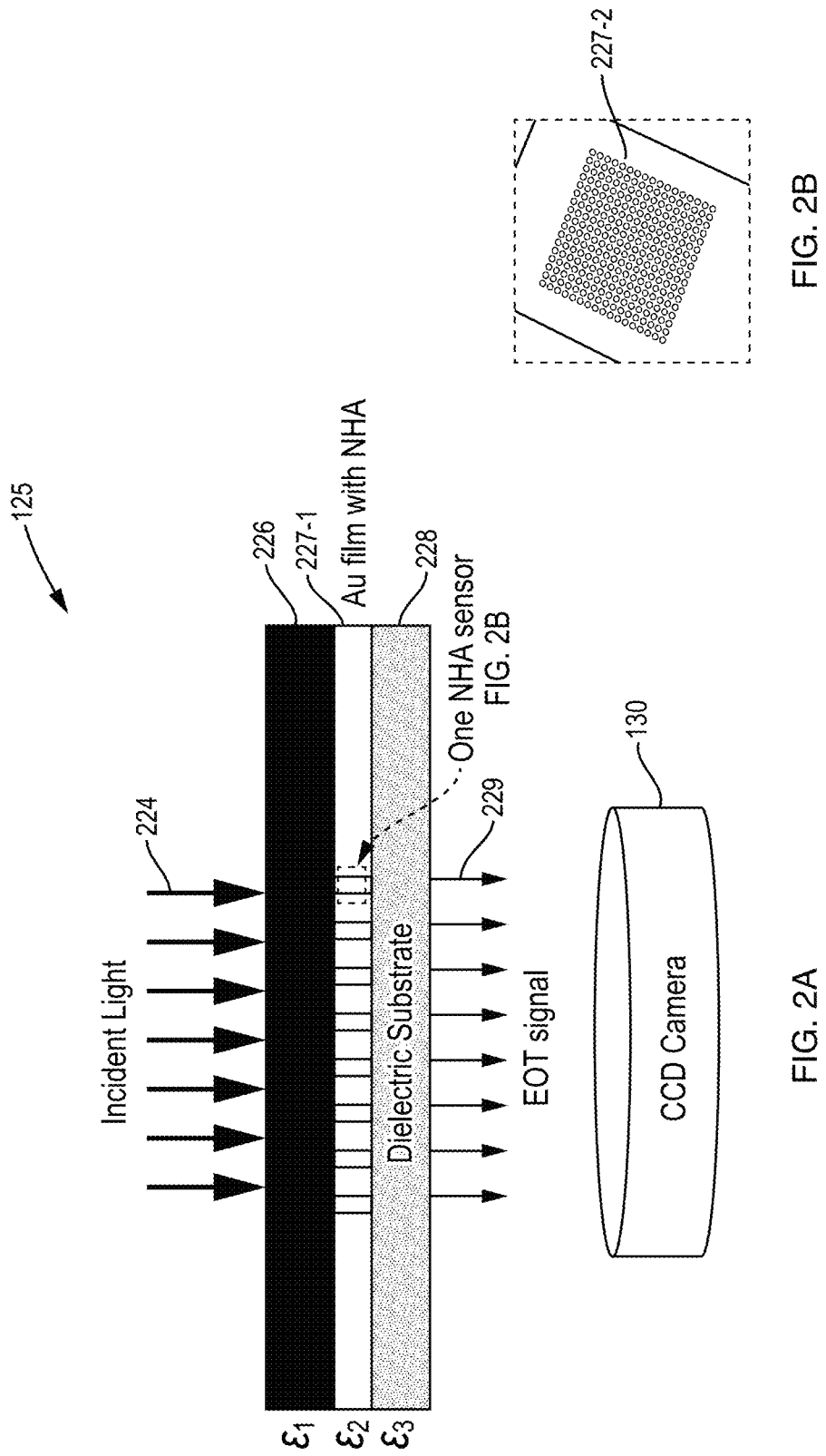
FIG. 2A is a schematic diagram of an example photonic sensor chip to be used in micro-calorimetry systems according to embodiments of the present disclosure.
FIG. 2B is a magnified view of a single nanohole array (NHA) sensor of the example photonic sensor chip of FIG. 2A.

FIG. 2A is a schematic diagram of an example photonic sensor chip 125 to be used in micro-calorimetry systems such as the system 100. Incident light 224 irradiates a sample 110, such as a fluid sample, or a dielectric layer 226 disposed thereunder. An inner gold-film layer 227-1 includes a nanohole arrays configured to produce an EOT signal 229 that passes through a dielectric substrate 228.

FIG. 2B is a magnified view of a single NHA sensor 227-2 of the example photonic sensor chip 125 shown in FIG. 2A.

Figure 3A:
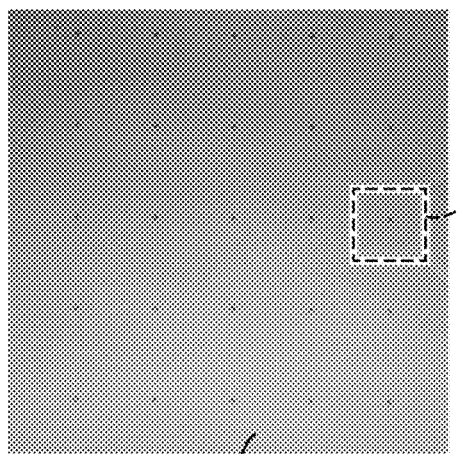
FIG. 3A is a close-range view of an example arrangement of NHA sensors of a photonic sensor chip to be used in micro-calorimetry systems according to embodiments of the present disclosure.

FIG. 3A is a close-range view of an example arrangement of NHA sensors of a photonic sensor chip 125 to be used in micro-calorimetry systems such as the system 100, according to embodiments of the present disclosure.

Figure 3B:
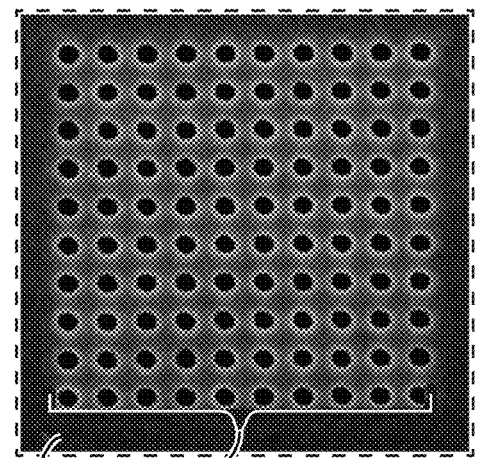
FIG. 3B is a magnified view of a single NHA sensor of the example arrangement of NHA sensors of FIG. 3A.

FIG. 3B is a magnified view of a single NHA sensor 227-2 of the arrangement thereof disposed through the photonic sensor chip 125 shown in FIG. 3A.

Figure 3C:
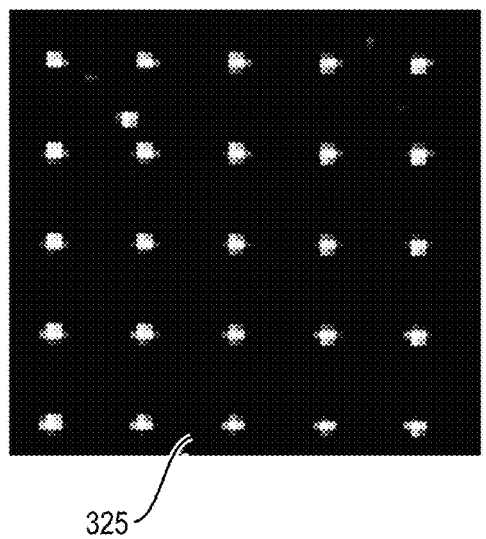
FIG. 3C is a graphically displayed still representation of video data captured by a light detector used in micro-calorimetry systems according to embodiments of the present disclosure.

FIG. 3C is a graphically displayed still representation 325 of video data captured by a light detector 130 used in micro-calorimetry systems such as the system 100. The displayed video data shows EOT observed by NHA sensors across a photonic chip 125.

Figure 4A:
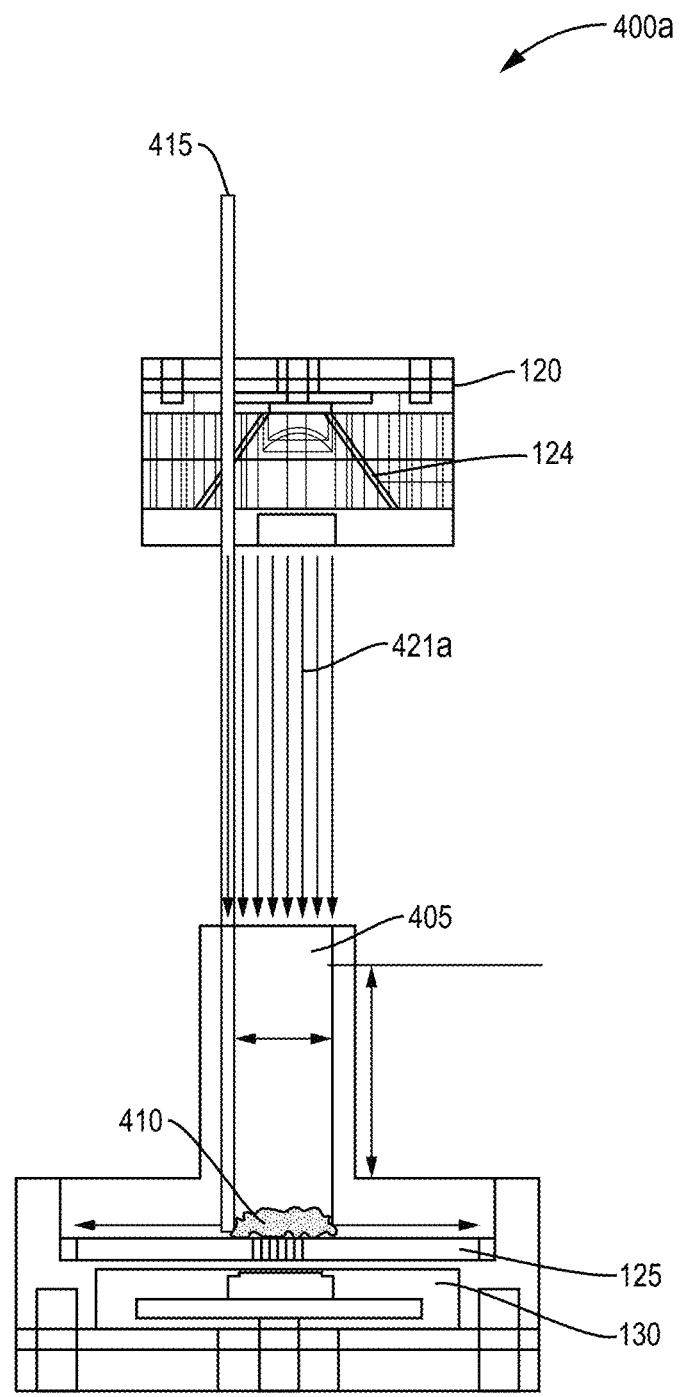
FIG. 4A is a schematic diagram of an example calorimetry unit to be used in a micro-calorimetry system according to an embodiment.

FIG. 4A is a schematic diagram of an example calorimetry unit 400a to be used in a well plate embodiment of a micro-calorimetry system 100. An input feature 115 includes a micro-pipette 415. Collimated light 421a passes through a well 405 and irradiates a sample 410 at the bottom of the well 405.

Figure 4C:
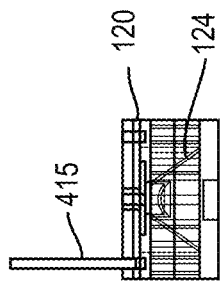
FIGS. 4C-4E are magnified views of components of the example calorimetry unit of FIG. 4B.
Figure 4D:
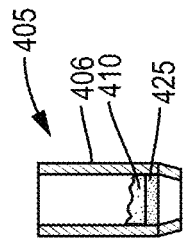
Figure 4E:
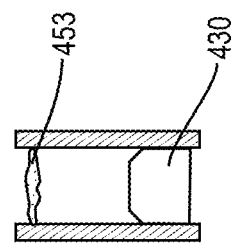
Figure 4B:
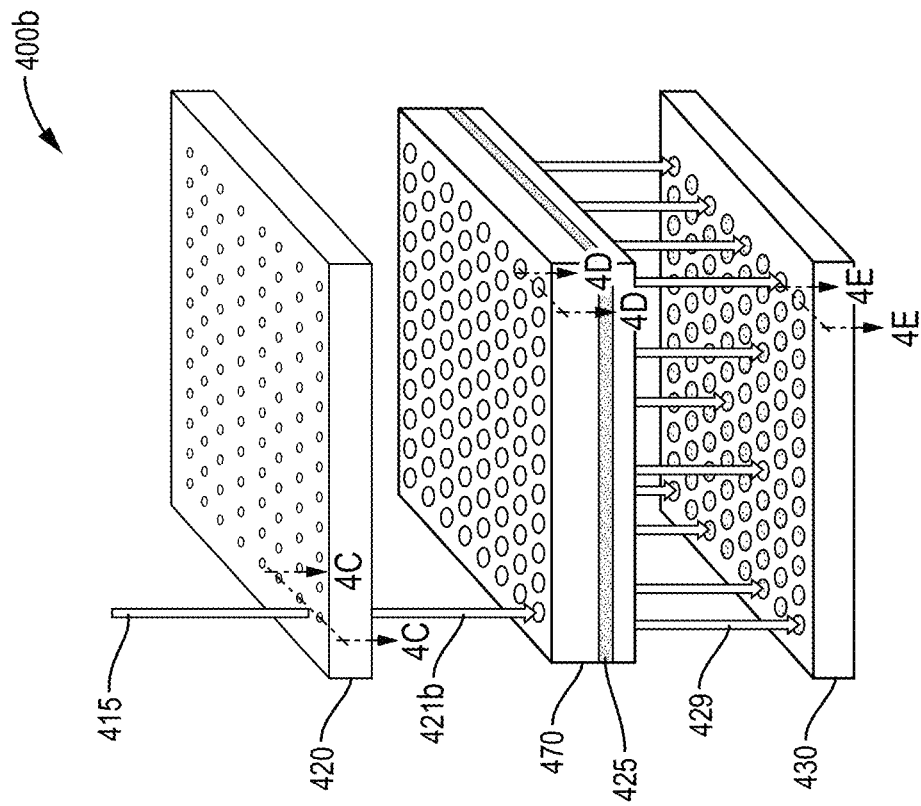
FIG. 4B is a schematic diagram of an example implementation of calorimetry units to be used in a micro-calorimetry system according to an embodiment.

FIG. 4B is a schematic diagram of an example implementation 400b of calorimetry units to be used in a well-plate embodiment of a micro-calorimetry system 100. Micro-pipette 415 may be a robotically controlled injection device. A light source assembly 420 may be configured to illuminate each well in a well plate, for example, 96 wells. Light beams 421b are shown to be incident upon the wells. Some light beams 421b are omitted for clarity.

FIG. 4C is a magnified internal view of light source assembly 420 of FIG. 4B. Light source 120, collimator 124, and micro-pipette 415 can be seen in FIG. 4C.

Returning to FIG. 4B, a modified 96 well plate 470 is shown to include a photonic sensor 425 in each well. The shaded band indicates the location of the photonic sensors 425.

FIG. 4D is a magnified internal view of a well 405 of the modified 96 well plate 470 of FIG. 4B. The well 405 is formed by well wall 406 and is shown to contain a liquid sample 410 above a photonic sensor chip 425.

Returning again to FIG. 4B, EOT transmissions 429 are shown emanating from the photonic sensors 425. Some EOT transmissions 429 are omitted for clarity. A light detector assembly 430 and recording device are subsequently shown.

FIG. 4E is a magnified view of the light detector assembly 430 and recording device, i.e., light detector system. An optical system 453 may include a lens configured to focus EOT transmissions 429 upon the light detector system.

Figure 5:
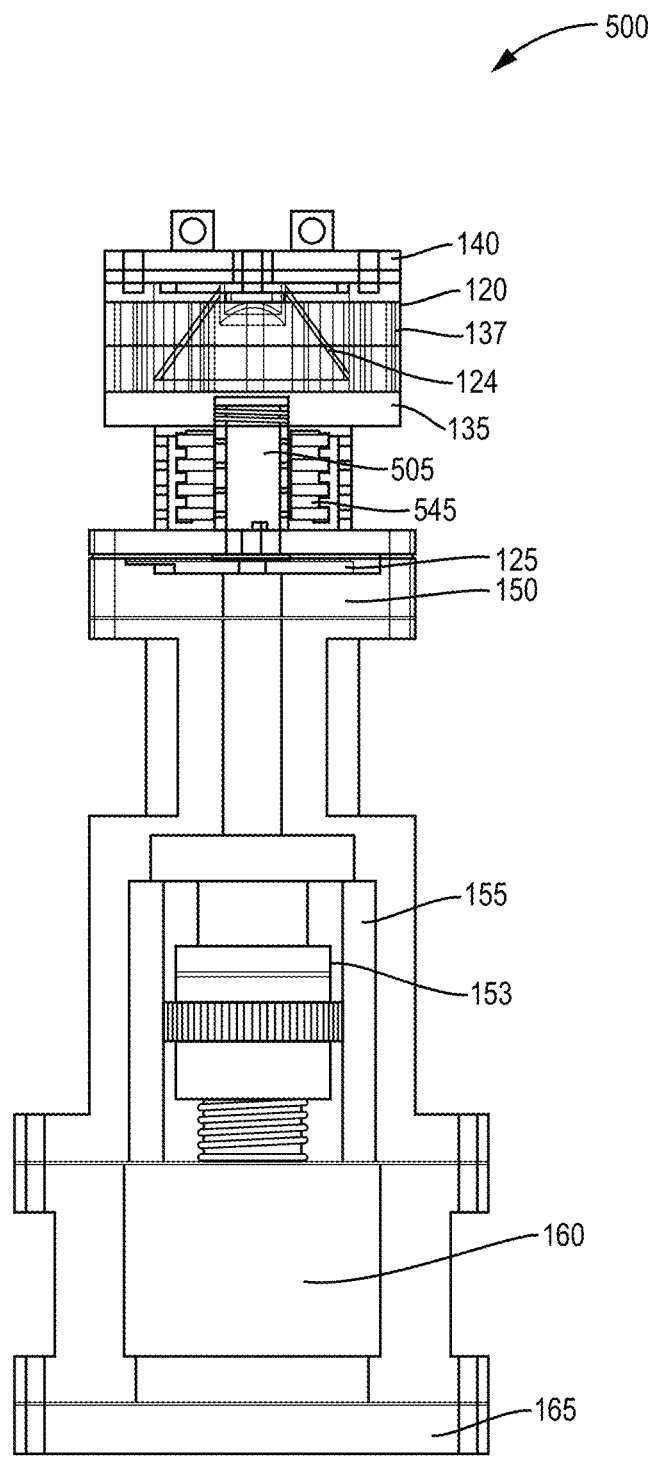
FIG. 5 is a schematic diagram of an example calorimetry unit to be used in a micro-calorimetry system according to an embodiment.

FIG. 5 is a schematic diagram of an example calorimetry unit 500 to be used in a floating embodiment of a micro-calorimetry system 100. A well 505 may include a sleeve 545 configured to be adjustable so as to control permission of fluid materials to flow into and out of the well 505.

Figure 6A:
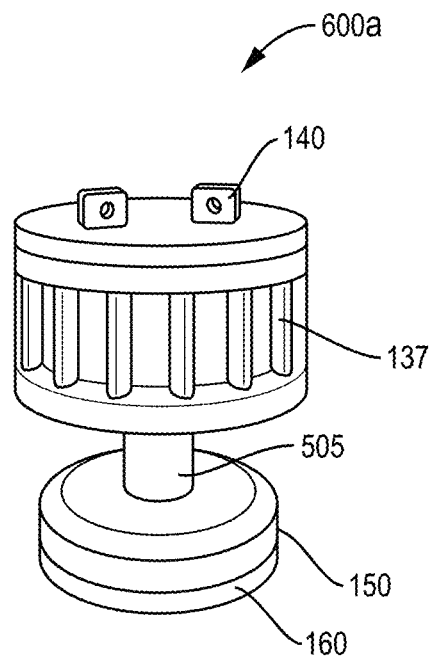
FIG. 6A is a perspective view of an example calorimetry unit to be used in a micro-calorimetry system according to an embodiment.

FIG. 6A is a perspective view of an example prototype calorimetry unit 600a to be used in a micro-calorimetry system 100. Elements of a calorimetry unit 600a may be realized with 3D-printed materials.

Figure 6B:
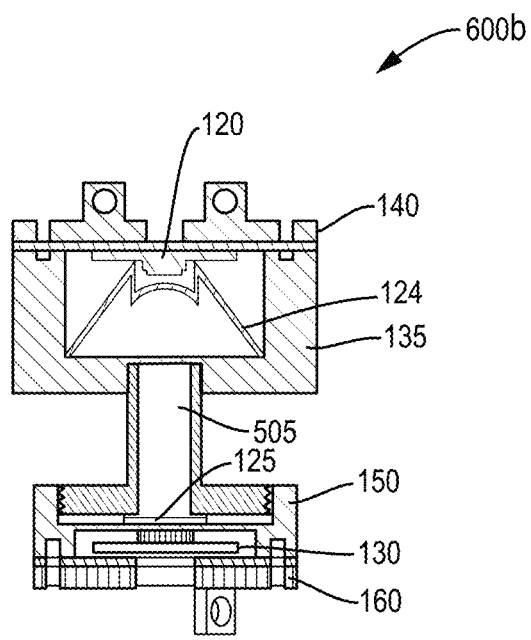
FIG. 6B is a cross-sectional schematic diagram of an example calorimetry unit to be used in a micro-calorimetry system according to an embodiment.
Figure 7A:
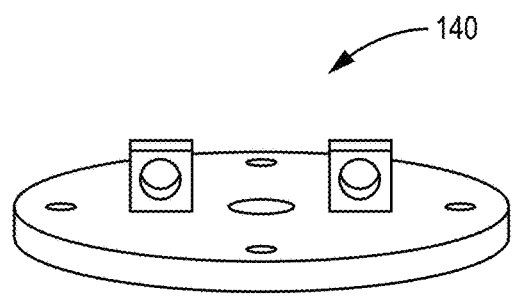
FIG. 7A is a perspective view of an end cap of an example calorimetry unit to be used in a micro-calorimetry system according to an embodiment.
Figure 7B:
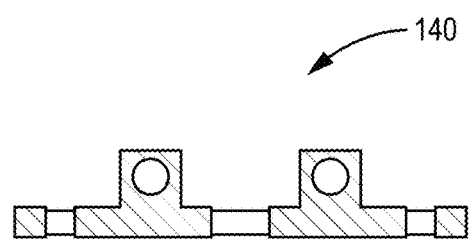
FIG. 7B is a cross-sectional view of an end cap of an example calorimetry unit to be used in a micro-calorimetry system according to an embodiment.

FIG. 6B is a cross-sectional schematic diagram of an example calorimetry unit 600b to be used in a micro-calorimetry system 100.

Figure 8:
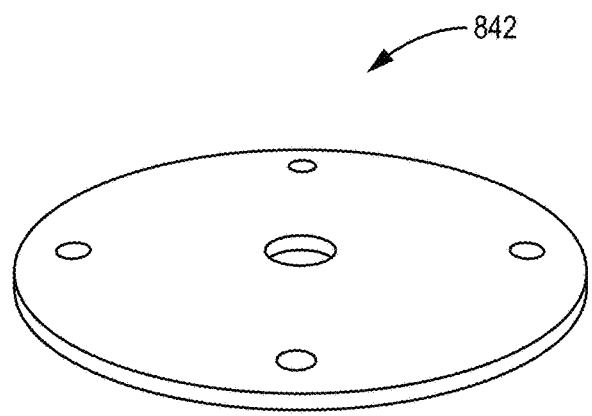
FIG. 8 is a perspective view of an O-ring or gasket to be used in conjunction with an end cap of an example calorimetry unit to be used in a micro-calorimetry system according to an embodiment.

FIG. 8 is a perspective view of an O-ring or gasket 842 to be used in conjunction with an end cap 140 of example calorimetry units to be used in a micro-calorimetry system 100.

Figure 9A:
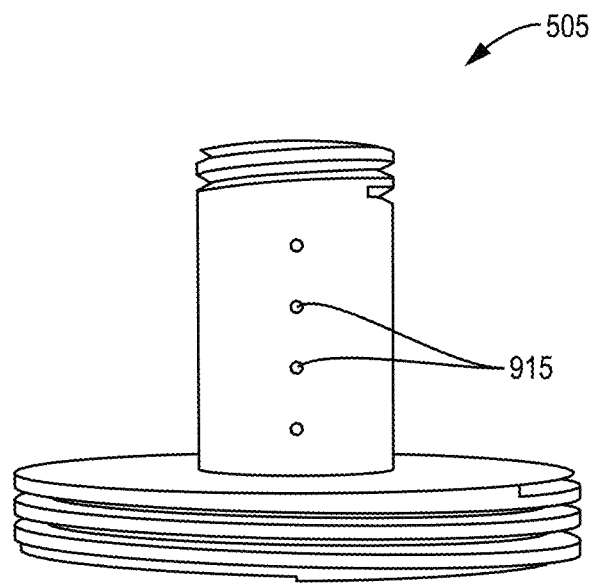
FIGS. 9A and 9B are respectively a side-view and a cross-sectional view of a well of an example calorimetry unit to be used in a micro-calorimetry system according to an embodiment.
Figure 9B:
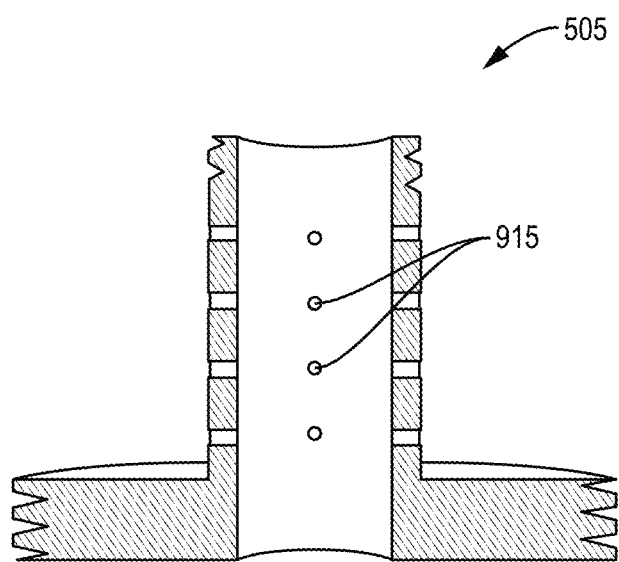

FIGS. 9A and 9B are respectively a side-view and a cross-sectional view of a well 505 of an example calorimetry unit to be used in a micro-calorimetry system 100. Input features 115 are shown to include a plurality of holes 915 disposed through walls of the well 505. Such input features 115 may be capable of alignment with corresponding input features disposed through walls of sleeves 545 (not shown in FIGS. 9A and 9B). Rotation of said sleeves 545 may thus open and close the input features 115 in the well.

Figure 10A:
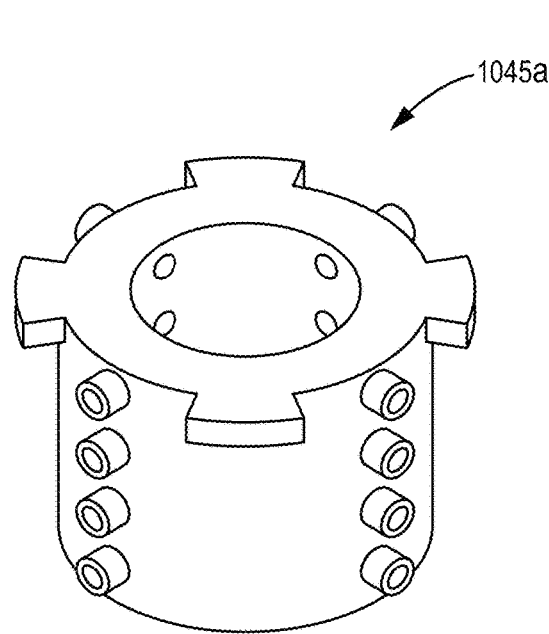
FIGS. 10A and 10B are perspective views of an inner and outer sleeve, respectively, of an example calorimetry unit to be used in a micro-calorimetry system according to an embodiment.
Figure 10B:
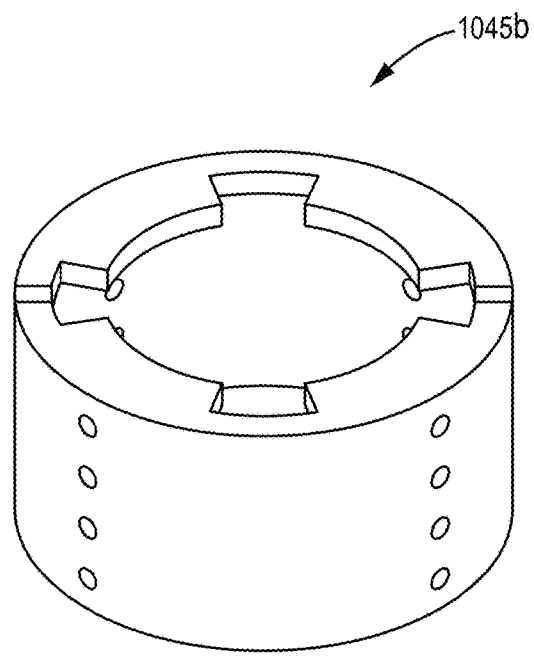

FIGS. 10A and 10B are perspective views of an inner 1045a and outer 1045b sleeve, respectively, of an example calorimetry unit to be used in a micro-calorimetry system 100 according to an embodiment.

Figure 10C:
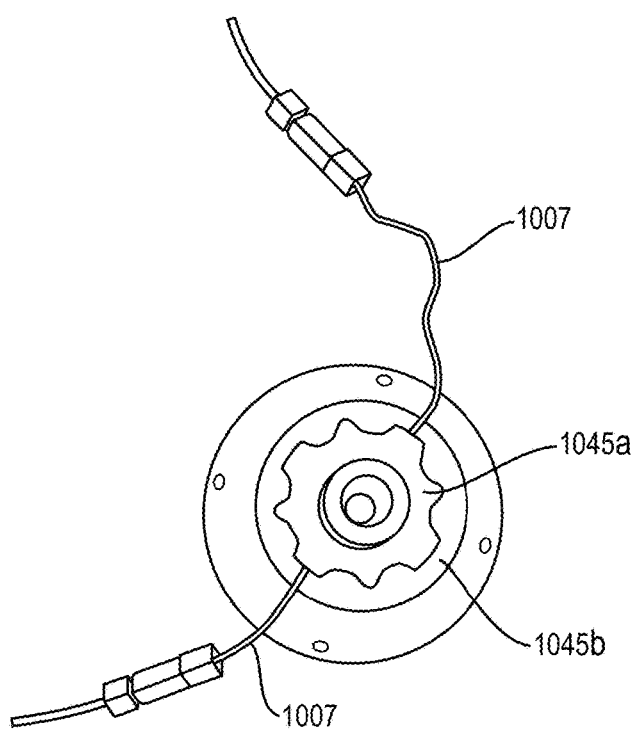
FIG. 10C is a top view of a sleeve of an example calorimetry unit to be used in a micro-calorimetry system according to an embodiment.
Figure 11A:
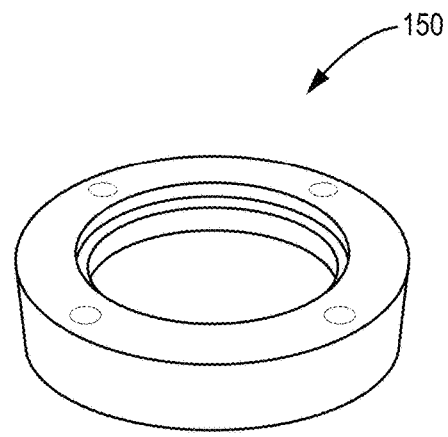
FIG. 11A is a perspective view of a frame element for holding a light source of an example calorimetry unit to be used in a micro-calorimetry system according to an embodiment.
Figure 11B:
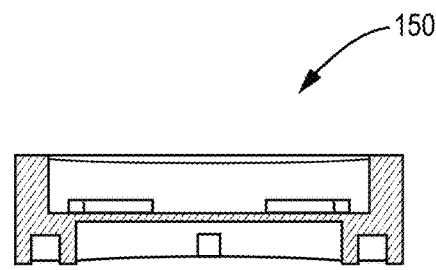
FIG. 11B is a cross-sectional view of frame element for holding a light source of an example calorimetry unit to be used in a micro-calorimetry system according to an embodiment.
Figure 12:
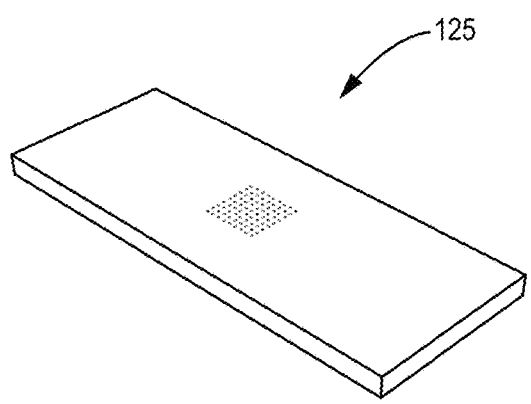
FIG. 12 is a perspective view of a photonic sensor chip, including an arrangement of NHA sensors, of an example calorimetry unit to be used in a micro-calorimetry system according to an embodiment.
Figure 13A:
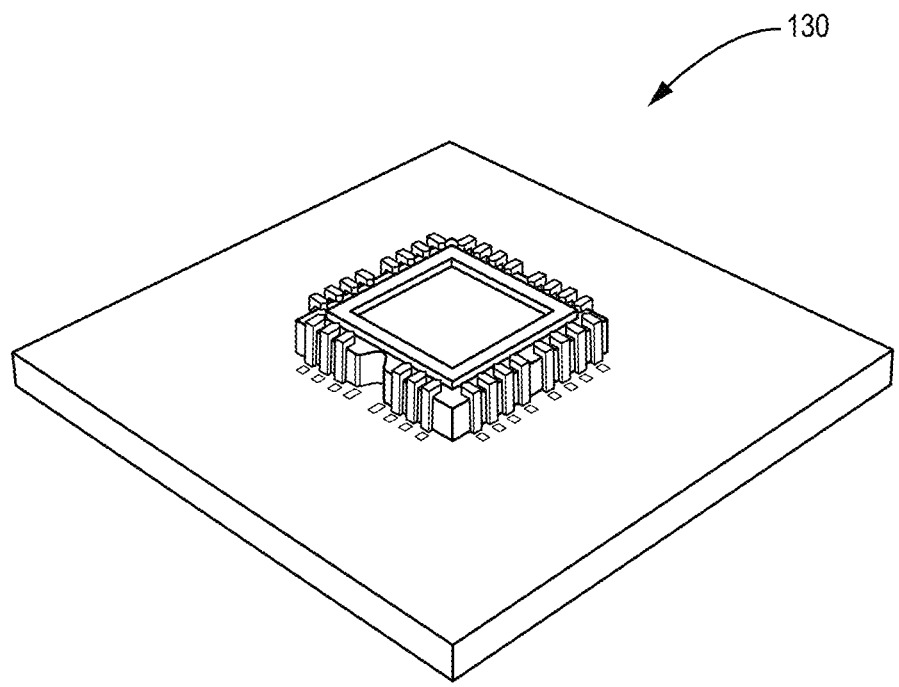
FIG. 13A is a perspective view of a light detector of an example calorimetry unit to be used in a micro-calorimetry system according to an embodiment.
Figure 13B:
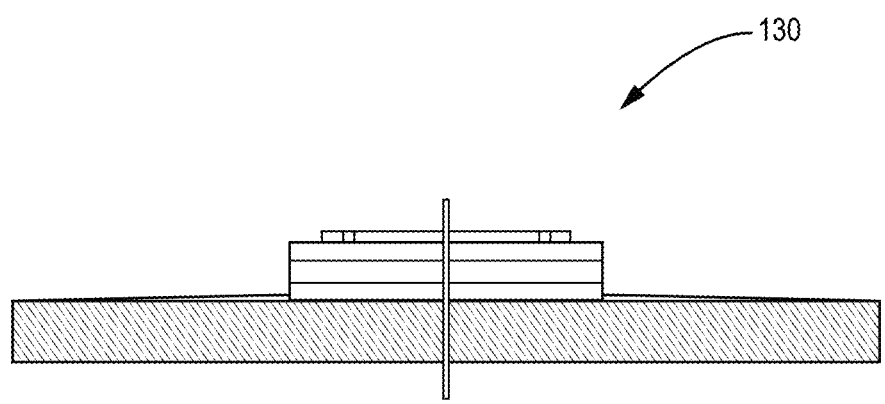
FIG. 13B is a cross-sectional view of a light detector of an example calorimetry unit to be used in a micro-calorimetry system according to an embodiment.

FIG. 10C is a top view of a sleeve 1045a, 1045b of an example calorimetry unit to be used in a micro-calorimetry system 100. Wires 1007 are shown to be held within the sleeve 1045a, 1045b and function as a heating device 107.

Figure 14:
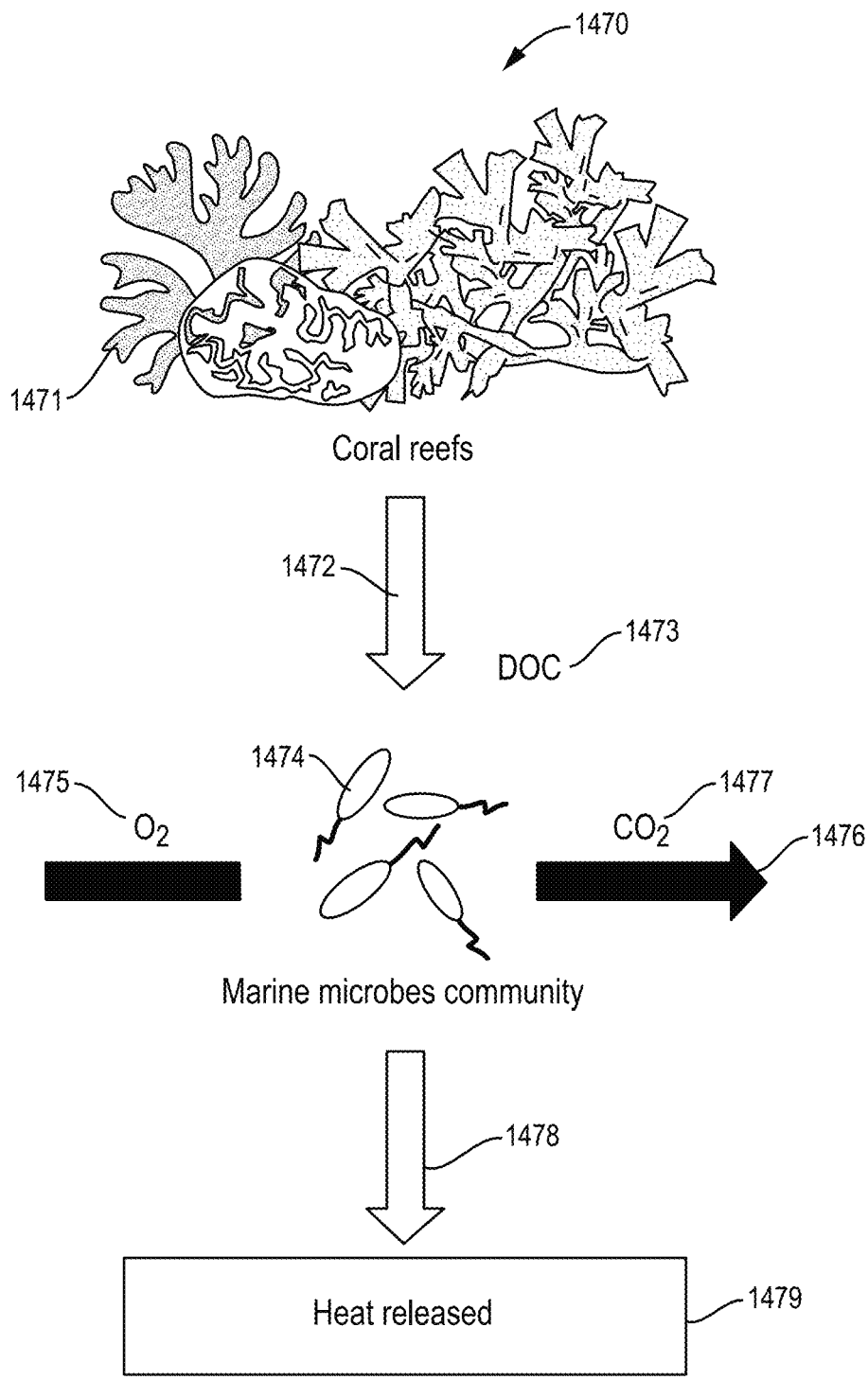
FIG. 14 is a flow diagram illustrating a use case of an example embodiment of a micro-calorimetry system according to the present disclosure.

FIG. 14 is a flow diagram 1470 illustrating a use case of an example embodiment of a micro-calorimetry system 100. An underwater coral reef 1471 may produce 1472 dissolved organic carbons (DOC) 1473 within a fluid environment 107. Microbes 1474 may break down such DOC 1473, combining DOC 1473 with oxygen 1475 and to yield 1476 carbon dioxide 1477 and also to release 1478 an amount of heat 1479 into the environment 170. Such heat 1479 may be measured and analyzed to provide insight as to health aspects of the coral reef 1471.

Figure 15:
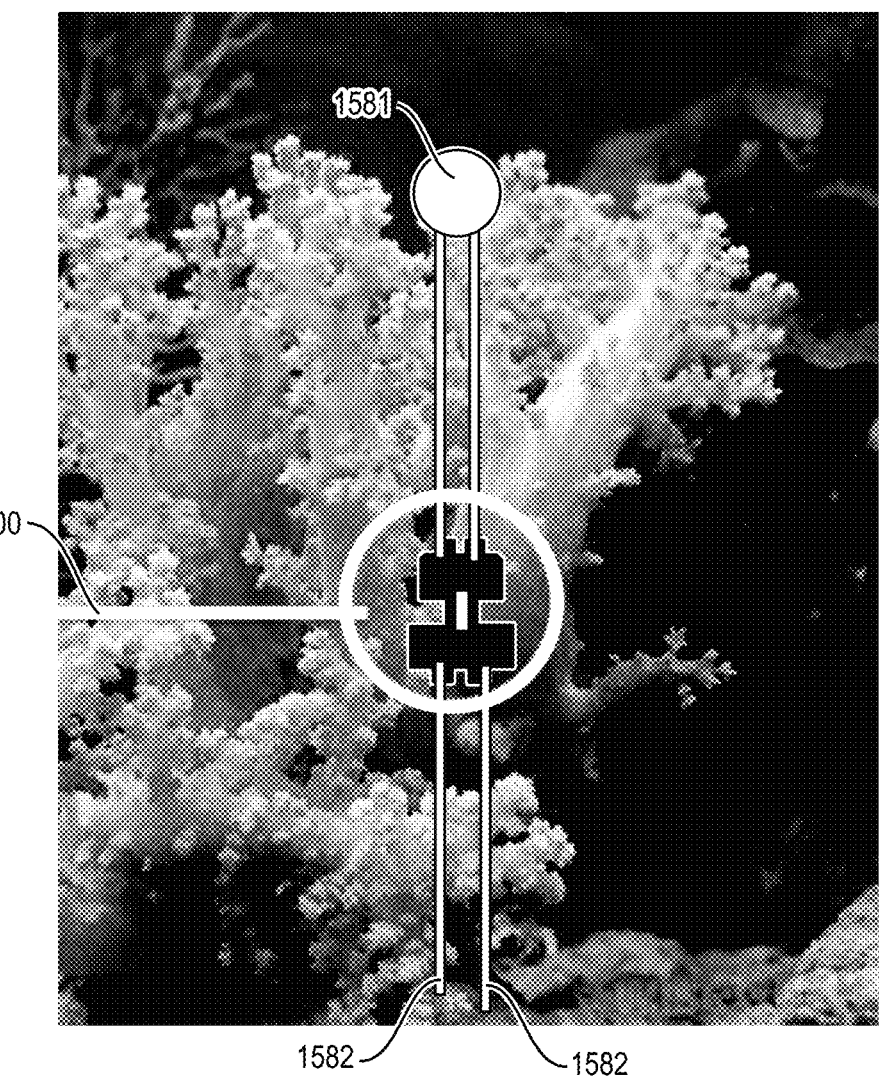
FIG. 15 is an image illustrating an example implementation of a micro-calorimetry system according to an embodiment.

FIG. 15 is an image illustrating an example floating micro-calorimetry device 500. Floating material 1581 and anchors 1582 are shown to control a vertical displacement of the device 500.

Figure 16A:
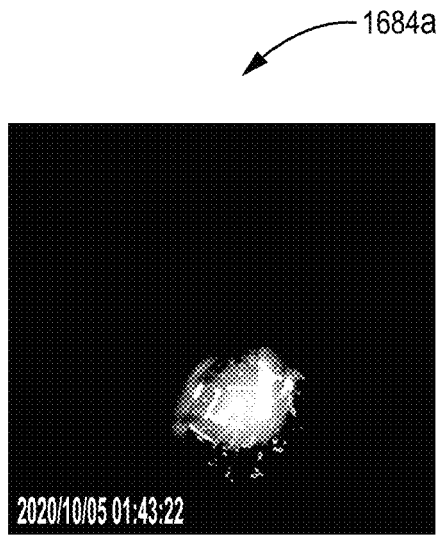
FIGS. 16A-16C are images of extraordinary optical transmission (EOT) through an NHA chip of an example calorimetry unit to be used in a micro-calorimetry system according to an embodiment.
Figure 16B:
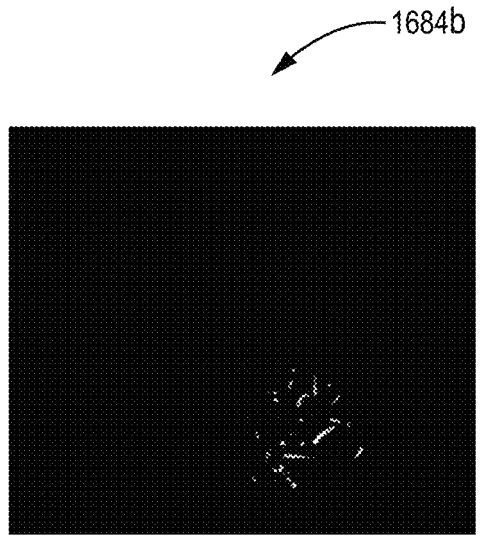
Figure 16C:
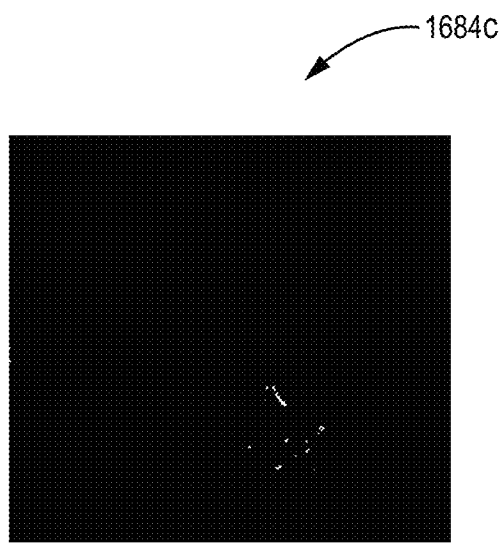

FIGS. 16A-16C are images of extraordinary optical transmission (EOT) 429 through an NHA sensor chip 125 of an example calorimetry unit to be used in a micro-calorimetry system 100, as viewed by a light detector 130. FIG. 16A shows a situation in which incident light is too intense, thus saturating the light detector. In FIG. 16B, an appropriate level of EOT is realized, allowing easy detection of changes in EOT. In FIG. 16C, an EOT signal is too weak to sufficiently discern.

Figure 17A:
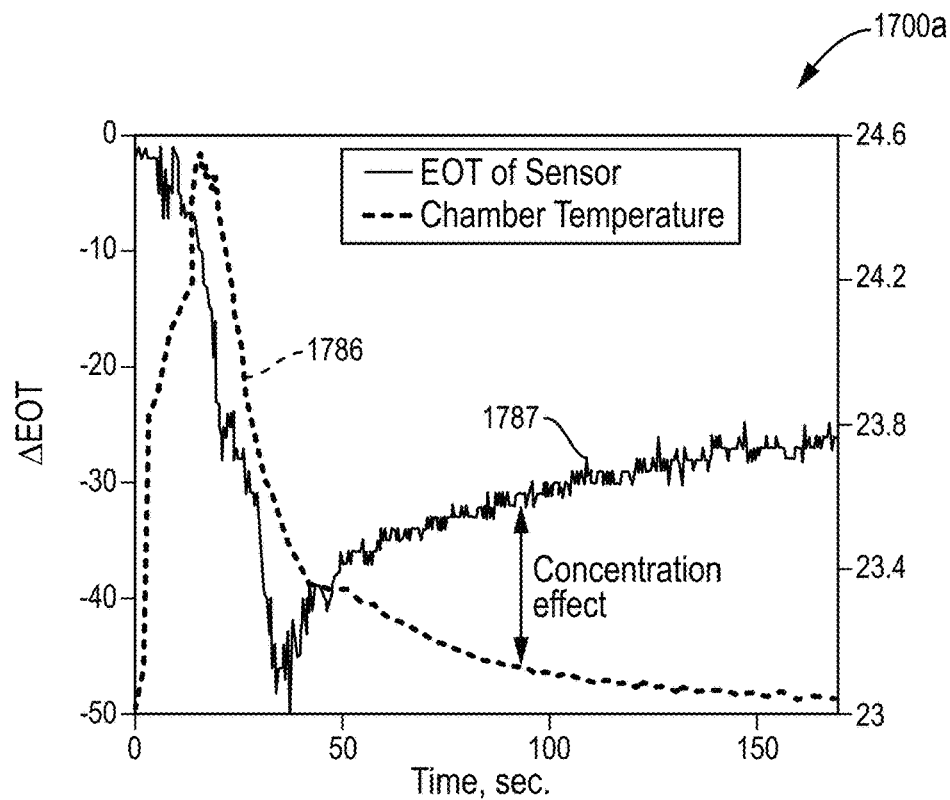
FIG. 17A is a plot of measured EOT vs. time and well temperature vs. time for a well into which a sample of ethanol is injected during testing, according to an embodiment. Measured EOT is plotted as EOT difference with respect to an initial EOT value.

FIG. 17A is a plot 1700a of EOT versus time and well temperature versus time for multiple NHA sensors in the well. In the example of FIG. 17A, the EOT values depicted in the plot 1700a represent averages of measured EOT for 1300 sensors. EOT values may alternatively be averaged over different numbers of NHA sensors as appropriate in a given system. EOT measurements are thus synchronized with a known heat rate as heat is applied to the sample-populated well. EOT is indicated as a differential measurement ΔEOT, taken as a difference with respect to a starting EOT value. Any of the EOT measurements referred to herein may be so implemented. EOT curve 1787 is seen in FIG. 17A to drop off immediately as heat begins to be applied as indicated by temperature curve 1786. As the sample in the well undergoes a change in response to the applied heat, the EOT is seen to reach a minimum value before gradually increasing again, as the well temperature due to applied heat peaks and subsequently decays.

Figure 17B:
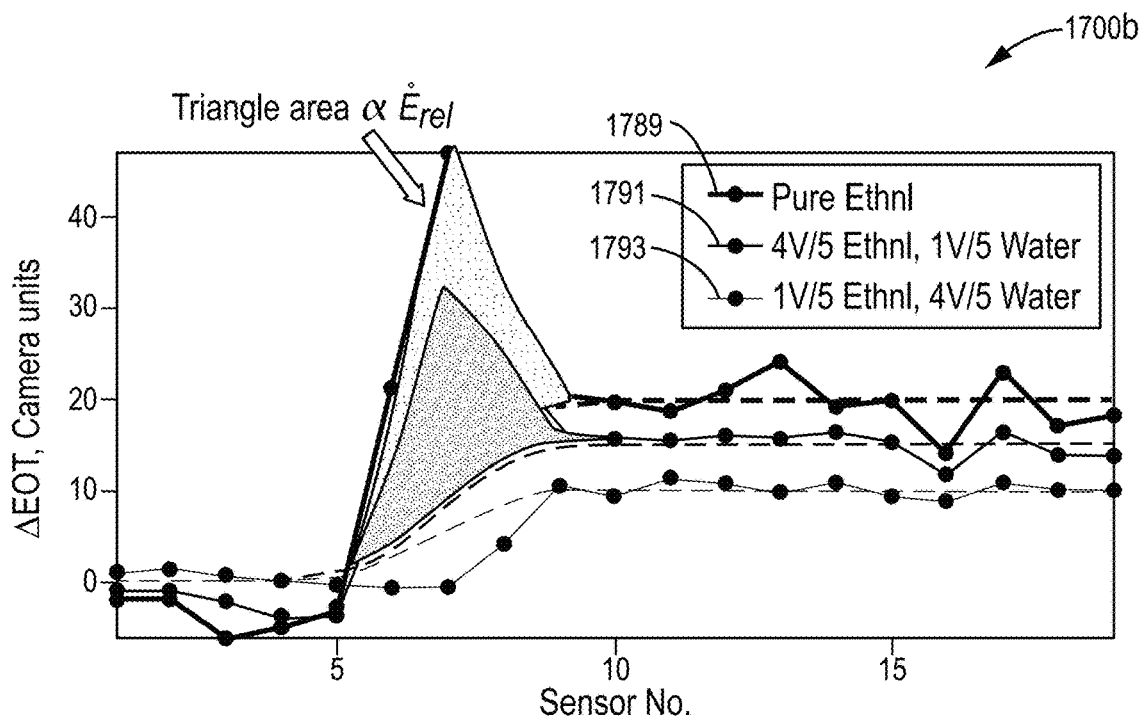
FIG. 17B is a plot of measured EOT vs. individual NHA sensors for different concentrations of samples, according to an embodiment.

FIG. 17B is a plot 1700b of EOT versus individual NHA sensor for three different concentrations of a pair of sample fluids within a test chamber, obtained in an embodiment. EOT curves are shown for the different concentrations, including a pure ethanol EOT curve 1789, an EOT curve for 80% ethanol-water solution 1791, and an EOT curve for a 20% ethanol-water solution 1793. Such EOT curves for different concentrations of the pair of sample fluids are indicative of different amounts of energy released upon heating of the samples, with pure ethanol releasing the most energy, and the 20% solution releasing the least energy, as a skilled person would expect. The plot for the pure ethanol solution 1789 and the plot for the 80% solution 1791 indicate that a bulk of the released energy was detected by sensor numbers 6, 7, and 8. The shaded triangular regions indicate heat released by reactions.

Figure 17C:
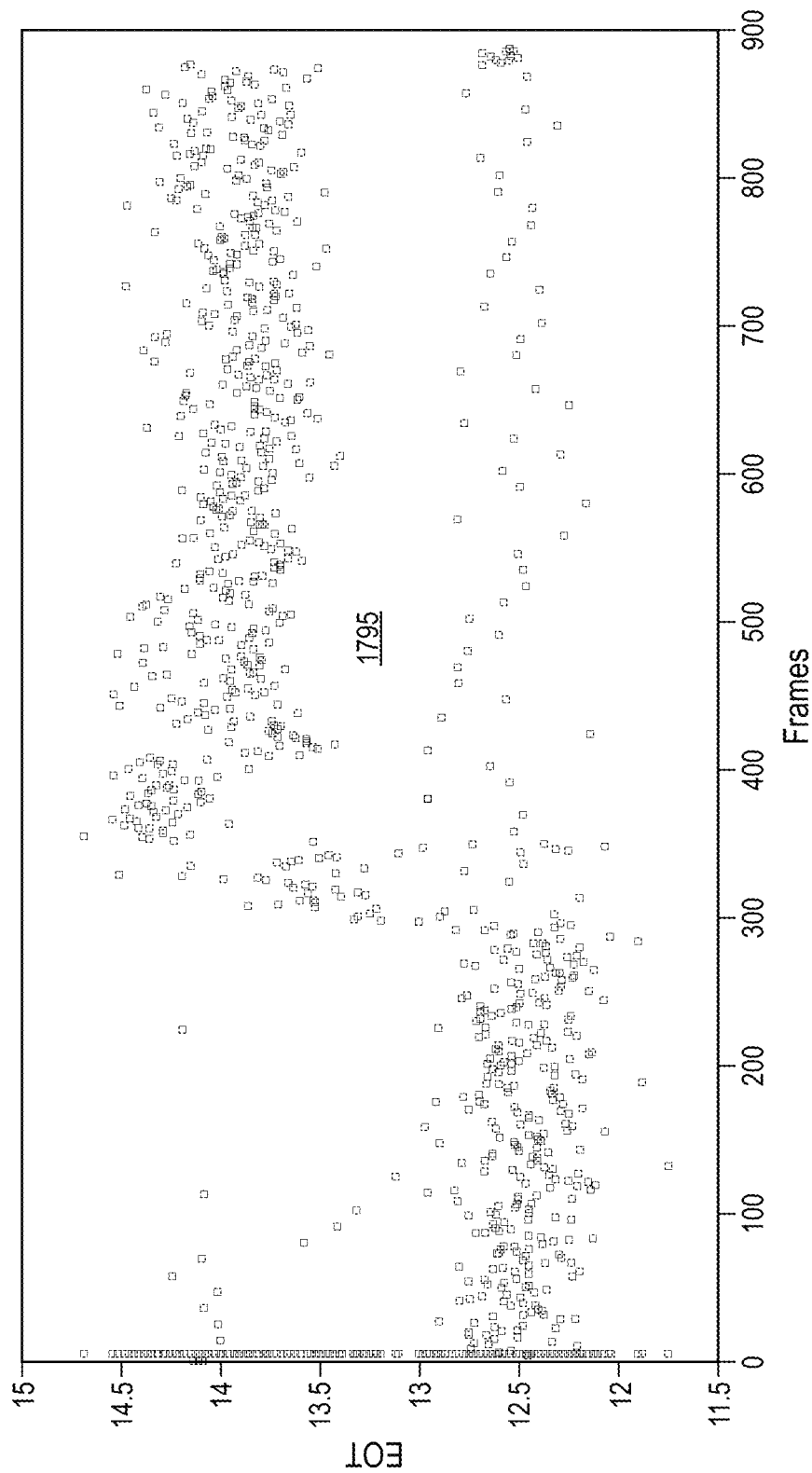
FIG. 17C is a plot of observed EOT, during an experiment, for each frame of a block of video data captured with a light detector of a micro-calorimetry system according to an embodiment.

FIG. 17C is a plot 1700c showing results of an experiment using a prototype of the floating micro-calorimeter embodiment with a spy camera. The camera was mounted within the camera holder frame element of the calorimetry unit. A video was recorded with the spy camera after initially putting the camera into the assembly and then adjusting the angle and settings. The EOT values 1795 calculated from each frame of the video data are shown in the plot. As light intensity of the LED was increased, the changing intensity produced a distinct upward step in the EOT, data as shown in the plot. Since EOT through a sensor is proportional to intensity of light incident upon the sensor, the observed upward step in EOT demonstrated that the calorimetry unit worked as expected.

Figure 17D:
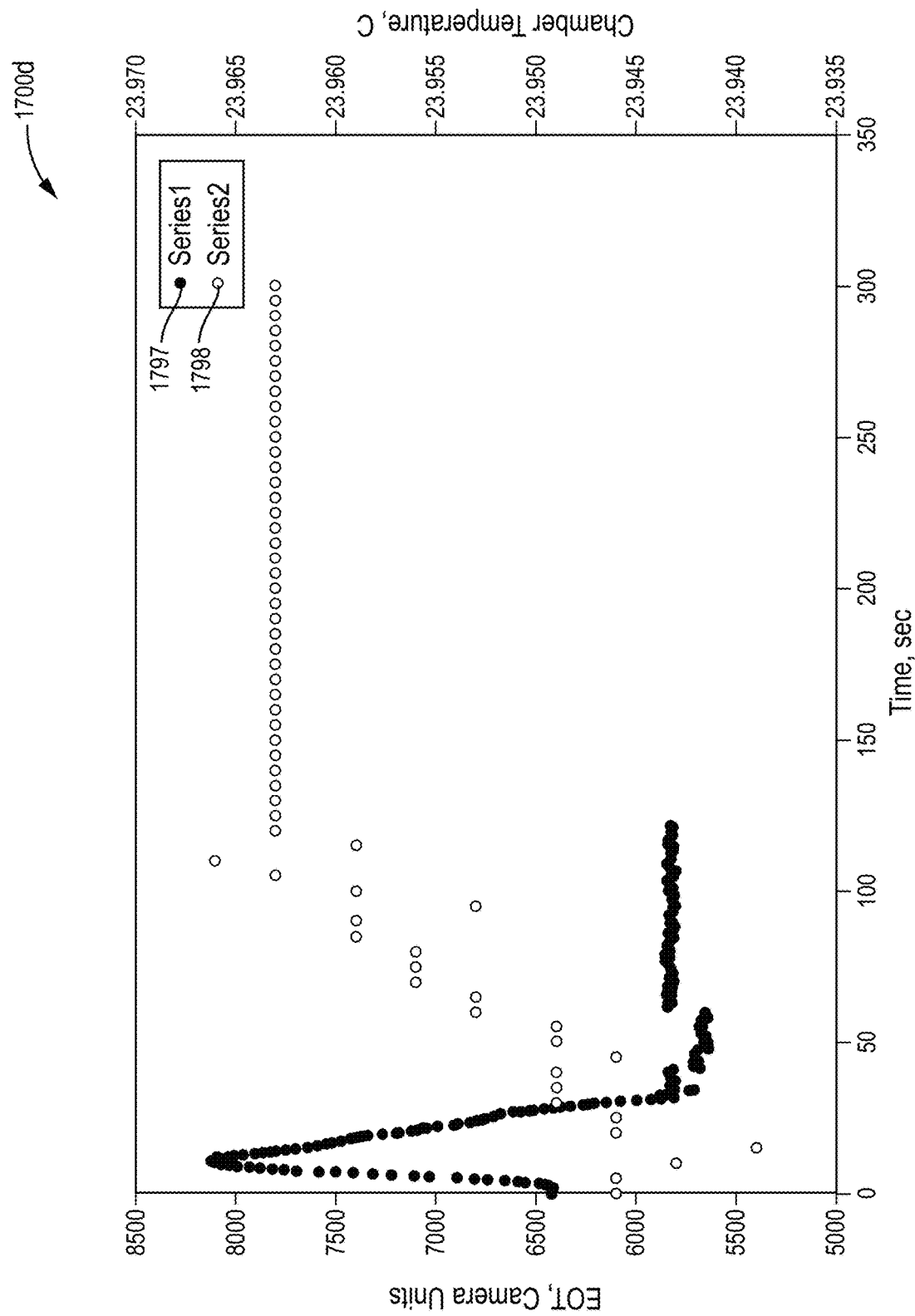
FIG. 17D is a plot of observed EOT vs. time and well temperature vs. time during an experiment with a microcalorimetry system according to an embodiment.

FIG. 17D is a plot 1700d showing results of an experiment performed within a well of a prototype of a floating micro-calorimeter. In the well, 50 ul of EDTA was injected through an injection feature of the prototype, and was kept at room temperature. Next, 15 ul of room temperature calcium chloride was injected into the well. The plot of FIG. 17D shows the EOT signal change and the temperature measurement by a thermistor placed in the chamber since initiating the first injection, of EDTA. As shown in the temperature plot 1798, the temperature initially dropped down because of the second, colder fluid flowing in, then the temperature increased because of a chemical reaction between the two injected fluids, and due to continued application of heat via the heater. The EOT plot 1797 shows a similar trend, responding to the change in temperature at the same time or sooner than the temperature plot. The EOT measurement responded more quickly than the temperature measurement because the optical sensors used for the EOT measurement inherently respond more quickly than the thermistor used for the temperature measurement. The plot of the EOT signal further shows that the EOT settled to a steady state at a lower value because of the concentration change in the chemical reaction.

Example Advantages

Microcalorimeters of the nature described herein offer numerous advantages over prior designs. Firstly, no direct wired connections are needed between a sample and a sensor. The small size of the sensor, as small as, e.g., 3 microns square, allows a small sample volume to be used, which allows the sensor to be placed in a single well of a well plate. Additionally, the small size, along with the high sensitivity of the device allow for slow reacting compounds, such as sugar proteins, to be investigated directly without additional chemical amplification steps. Furthermore, the small size reduces compound consumption and reduces cost and time required to test subject compounds. The small size, along with the photonic characteristic of the sensor, allows the device to be multiplexed on a single chip for high throughput applications. An order of magnitude reduction in test time, and a 20 times reduction in compound consumed, may be realized. The high sensitivity of the sensor allows the device to be used with materials typically having small energy releases upon reaction, such as, for example, sugar proteins. Such sensitivity may be, for example, 5 pJ. Further advantages include enabling the field capture data acquisition and post processing procedure described hereinabove. Some embodiments, such as implementations of the floating micro-calorimeter, may be particularly useful in situ in field studies, unlike traditional calorimeters.

Example Applications

Various example applications of embodiments include drug discovery; quality control monitoring; genome investigation; studying energy releases associated with protein unfolding; studying energy releases associated with changes in materials, such as phase changes, structural changes and magnetic changes; and various applications in the pharmaceutical and biotechnology areas, among others.

Additional uses of embodiments include testing of biohazardous materials, testing of explosive materials, and integration into material testing related to phase changes of materials. The small size of embodiments, and ability of embodiments to be monitored remotely, improve safety of testing the above types of materials. Embodiments also promote introduction of calorimetry to new market segments, such as underwater environmental monitoring.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A system for calorimetry, the system comprising:
   a) a well having a volume for receiving a sample;
   b) an input feature configured to facilitate reception of the sample in the well;
   c) a light source configurable to irradiate the well and the sample with incident light;
   d) a photonic sensor chip disposed at the bottom of the well, the photonic sensor chip comprising plural nanohole array (NHA) sensors integrated upon a substrate;

e) a light detector configured to measure transmission of light through the NHA sensors to obtain a series of extraordinary optical transmission (EOT) measurements;

f) frame elements configured to secure and mutually couple the light source, the photonic sensor chip, the light detector, and the input feature to form a calorimetry unit, wherein the frame elements include a chip holder and a light detector holder, the chip holder and the light detector holder each configured to couple with one or more other frame elements of the calorimetry unit, the chip holder adapted to hold the photonic sensor chip at the bottom of the well, and the light detector holder adapted to hold the light detector to receive light transmitted as an EOT transmission through the NHA sensors of the photonic sensor chip; and g) a processor configured to calculate a calorimetry measurement as a function of the series of EOT measurements, the calorimetry measurement being indicative of energy released as a result of the sample in the well undergoing a change.

2. The system of claim 1, wherein the input feature includes an injection device configured to access the volume of the well and deposit the sample therein.

3. The system of claim 2, wherein the well is one of a plurality of wells disposed upon a well plate.

4. The system of claim 1, wherein the input feature includes a plurality of diffusion features disposed through a frame element forming a wall of the well, the plurality of diffusion features configured, while the calorimetry unit is immersed in a fluid, to permit a volume of the fluid including the sample to flow into the well.

5. The system of claim 4, further comprising at least one filter element configured to control the flow of the sample into the well.

6. The system of claim 1, further comprising a power supply configured to control an intensity of the light source within a range of intensities between 0 and 500 lux, according to a voltage setting of the power supply.

7. The system of claim 6, wherein the power supply is spatially separated from the calorimetry unit and includes at least one battery, or a switchable DC power supply device.

8. The system of claim 1, wherein the light source includes a light-emitting diode (LED) and a collimator operatively coupled with the LED to control a direction of rays of light emitted by the LED.

9. The system of claim 1, further including a heater in thermal contact with the well, and a heater controller coupled to the heater, the heater controller programmed to control the heater to apply heat to the well with the sample provided therein.

10. The system of claim 1, wherein the light detector includes at least one of (i) a charge-coupled device (CCD) chip or a photo-multiplier tube (PMT) positioned to receive light transmitted as an EOT transmission through the NHA sensors of the photonic sensor chip disposed at the bottom of the well, and (ii) a camera positioned to receive light transmitted as an EOT transmission at least through the NHA sensors of the photonic sensor chip disposed at the bottom of the well.

11. The system of claim 10, wherein the light detector includes the camera, and the camera is positioned to receive light transmitted as an EOT transmission through NHA sensors of a plurality of photonic sensor chips, each photonic sensor chip of the plurality of photonic sensor chips being respectively disposed at the bottom each well in a well plate.

12. The system of claim 1, further comprising a lens configurable to focus, upon the light detector, light transmitted as an EOT transmission through the NHA sensors of the photonic sensor chip disposed at the bottom of the well, the system further comprising a lens frame element configured to secure the lens and to be mutually physically coupled with one or more other frame elements of the calorimetry unit.

13. The system of claim 1, further comprising an optics controller configured to control aspects of at least one of the light source and the light detector, the system further comprising memory configured to store data acquired from the light detector.

14. The system of claim 13, wherein the processor, the optics controller, and the memory are integrated within an electronic microcontroller device operatively coupled with, and spatially separate from, the calorimetry unit.

15. The system of claim 3, wherein each well of the plurality of wells is arranged to receive a respective sample by a respective input feature.

16. The system of claim 3, wherein each well of the plurality of wells comprises a respective light detector configured to measure transmission of light through the NHA sensors to obtain a series of EOT measurements.

17. The system of claim 3, wherein each well of the plurality of wells comprises a respective photonic sensor chip disposed at the bottom of the well.

18. The system of claim 4, wherein the calorimetry unit is a floating calorimetry unit configured to be suspended in the fluid.

19. The system of claim 18, further comprising a floating material connected to an upper end cap of the frame elements and at least one anchor connected to a lower end cap of the frame elements, to control a vertical displacement of the floating calorimeter unit.

20. The system of claim 2, wherein the injection device comprises at least one of a microfluidic injector, a dip pen, and a micro pipette.

21. A system for calorimetry, the system comprising:
a well having a volume for receiving a sample;
an input feature configured to facilitate reception of the sample in the well;
a light source configurable to irradiate the well and the sample with incident light;
a photonic sensor chip disposed at the bottom of the well, the photonic sensor chip comprising plural nanohole array (NHA) sensors integrated upon a substrate;
a light detector configured to measure transmission of light through the NHA sensors to obtain a series of extraordinary optical transmission (EOT) measurements;
frame elements configured to secure and mutually couple the light source, the photonic sensor chip, the light detector, and the input feature to form a floating calorimetry unit;
wherein the input feature includes a plurality of diffusion features disposed through a frame element forming a wall of the well, the plurality of diffusion features configured, while the floating calorimetry unit is immersed in and suspended in a fluid, to permit a volume of the fluid including the sample to flow into the well; and
a processor configured to calculate a calorimetry measurement as a function of the series of EOT measurements, the calorimetry measurement being indicative of energy released as a result of the sample in the well undergoing a change.

22. The system of claim 21, further comprising a floating material connected to an upper end cap of the frame elements and at least one anchor connected to a lower end cap of the frame elements, to control a vertical displacement of the floating calorimeter unit.

\* \* \* \* \*